United States Patent
Noll

(10) Patent No.: US 10,904,490 B1
(45) Date of Patent: *Jan. 26, 2021

(54) INFERRED ACTIVITY BASED CONFERENCE ENHANCEMENT METHOD AND SYSTEM

(71) Applicant: Steelcase Inc., Grand Rapids, MI (US)

(72) Inventor: Paul Noll, Grand Rapids, MI (US)

(73) Assignee: STEELCASE INC., Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/676,749

(22) Filed: Nov. 7, 2019

Related U.S. Application Data

(63) Continuation of application No. 15/916,769, filed on Mar. 9, 2018, now Pat. No. 10,531,050, which is a continuation of application No. 15/276,089, filed on Sep. 26, 2016, now Pat. No. 9,942,523, which is a continuation of application No. 14/617,320, filed on Feb. 9, 2015, now Pat. No. 9,479,730.

(60) Provisional application No. 61/939,535, filed on Feb. 13, 2014.

(51) Int. Cl.
| | |
|---|---|
| *H04N 7/14* | (2006.01) |
| *H04N 7/18* | (2006.01) |
| *G06F 16/9038* | (2019.01) |
| *G10L 15/08* | (2006.01) |
| *G06K 9/00* | (2006.01) |
| *G06F 16/903* | (2019.01) |
| *H04L 29/08* | (2006.01) |

(52) U.S. Cl.
CPC ......... *H04N 7/181* (2013.01); *G06F 16/9038* (2019.01); *G06F 16/90335* (2019.01); *G06K 9/00369* (2013.01); *G10L 15/08* (2013.01); *H04L 67/12* (2013.01)

(58) Field of Classification Search
CPC ............... A47B 23/06; G06F 16/90335; G06F 16/9038; G06F 3/0488; G06K 9/00369; G10L 15/08; H04L 67/12; H04N 7/14; H04N 7/15; H04N 7/181; H04N 7/142; H04N 7/148
USPC ............... 345/1.1, 173, 677, 204; 348/14.03, 348/14.07, 14.08, 77, 14.01; 434/322, 434/362; 700/94; 704/235; 715/753, 715/740, 751, 757, 863; 353/122; 370/260; 381/300; 705/7.15; 709/204
See application file for complete search history.

(56) References Cited

U.S. PATENT DOCUMENTS

| | | |
|---|---|---|
| 4,004,084 A | 1/1977 | Brown et al. |
| 5,438,357 A | 8/1995 | McNelley |
| 5,440,624 A | 8/1995 | Schoof, II |
| 5,465,370 A | 11/1995 | Ito et al. |
| 5,530,861 A | 6/1996 | Diamant et al. |

(Continued)

*Primary Examiner* — Gerald Gauthier
(74) *Attorney, Agent, or Firm* — Quarles & Brady LLP

(57) ABSTRACT

A method and system for optimizing conference session activities within a conference space, the system comprising at least a first sensor for sensing session characteristics and a processor receiving the sensed session characteristics and identifying a conference paradigm based on the sensed session characteristics, identifying an action sequence to perform as a function of the conference paradigm and performing the action sequence, wherein the action sequence results in automatic presentation of at least some information to at least a subset of conferees within the conference space.

56 Claims, 13 Drawing Sheets

(56) References Cited

U.S. PATENT DOCUMENTS

| | | | |
|---|---|---|---|
| 5,572,248 A | 11/1996 | Allen et al. | |
| 5,592,547 A | 1/1997 | Wu et al. | |
| 5,631,967 A | 5/1997 | Wagner et al. | |
| 5,794,177 A | 8/1998 | Carus et al. | |
| 5,835,667 A | 11/1998 | Wactlar et al. | |
| 6,275,258 B1 | 8/2001 | Chim | |
| 6,693,661 B1 | 2/2004 | Vanderwilt et al. | |
| 6,816,858 B1 | 11/2004 | Coden et al. | |
| 7,126,627 B1 | 10/2006 | Lewis et al. | |
| 7,167,191 B2 | 1/2007 | Hull et al. | |
| 7,532,232 B2 | 5/2009 | Shah et al. | |
| 7,669,127 B2 | 2/2010 | Hull et al. | |
| 7,720,836 B2 | 5/2010 | Abajian et al. | |
| 7,734,693 B2 | 6/2010 | Ardulov | |
| 7,752,186 B2 | 7/2010 | Abajian | |
| 7,768,543 B2 | 8/2010 | Christiansen | |
| 7,769,756 B2 | 8/2010 | Krikorian et al. | |
| 7,821,510 B2 * | 10/2010 | Aksemit | G06Q 10/10 345/204 |
| 8,072,481 B1 | 12/2011 | McNelley et al. | |
| 8,159,945 B2 | 4/2012 | Muro et al. | |
| 8,411,130 B2 | 4/2013 | Lee et al. | |
| 8,464,184 B1 * | 6/2013 | Cook | G06F 3/04883 715/863 |
| 8,521,511 B2 | 8/2013 | Balchandran et al. | |
| 8,600,084 B1 * | 12/2013 | Garrett | H04R 5/04 381/300 |
| 8,717,404 B2 | 5/2014 | Goyal et al. | |
| 8,805,110 B2 | 8/2014 | Rhoads et al. | |
| 8,819,536 B1 | 8/2014 | Lucovsky et al. | |
| 8,819,729 B2 | 8/2014 | Chavez | |
| 8,850,522 B2 | 9/2014 | Vakil et al. | |
| 8,861,848 B2 | 10/2014 | Sato | |
| 8,947,488 B2 * | 2/2015 | Han | H04N 7/15 348/14.01 |
| 9,065,976 B2 | 6/2015 | Hegde et al. | |
| 9,077,849 B2 | 7/2015 | Meek | |
| 9,118,940 B2 | 8/2015 | Valentine et al. | |
| 9,197,848 B2 | 11/2015 | Felkai et al. | |
| 9,261,262 B1 * | 2/2016 | Baloga | A47B 21/00 |
| 9,307,202 B2 | 4/2016 | Andresen et al. | |
| 9,479,730 B1 * | 10/2016 | Noll | H04N 7/181 |
| 9,491,374 B1 | 11/2016 | Avrahami et al. | |
| 9,524,588 B2 | 12/2016 | Barzuza et al. | |
| 9,787,738 B2 | 10/2017 | Hix et al. | |
| 9,942,523 B1 | 4/2018 | Noll | |
| 10,075,656 B2 * | 9/2018 | Oetting | G01S 17/42 |
| 10,334,206 B2 * | 6/2019 | Periyannan | H04N 7/152 |
| 10,531,050 B1 | 1/2020 | Noll | |
| 2002/0126120 A1 | 9/2002 | Snowdon et al. | |
| 2002/0132216 A1 * | 9/2002 | Dohrmann | G09B 5/00 434/362 |
| 2002/0184195 A1 | 12/2002 | Qian | |
| 2003/0098819 A1 * | 5/2003 | Sukthankar | G09G 3/002 345/1.1 |
| 2003/0187632 A1 | 10/2003 | Menich | |
| 2003/0234859 A1 | 12/2003 | Malzbender et al. | |
| 2004/0117405 A1 | 6/2004 | Short et al. | |
| 2004/0128350 A1 | 7/2004 | Topfl et al. | |
| 2004/0239754 A1 * | 12/2004 | Shachar | H04L 29/06027 348/14.08 |
| 2004/0252185 A1 * | 12/2004 | Vernon | G06Q 10/10 348/14.08 |
| 2005/0192940 A1 | 9/2005 | Morris | |
| 2005/0254440 A1 | 11/2005 | Sorrell | |
| 2005/0267778 A1 | 12/2005 | Kazman | |
| 2006/0217967 A1 | 9/2006 | Goertzen et al. | |
| 2007/0011154 A1 | 1/2007 | Musgrove et al. | |
| 2007/0016557 A1 | 1/2007 | Moore et al. | |
| 2007/0081644 A1 | 4/2007 | Jachner | |
| 2007/0097886 A1 | 5/2007 | Schwagmann et al. | |
| 2007/0100939 A1 | 5/2007 | Bagley et al. | |
| 2007/0143402 A1 | 6/2007 | Kumagai | |
| 2008/0068566 A1 * | 3/2008 | Denoue | G03B 21/006 353/122 |
| 2009/0147772 A1 | 6/2009 | Rao et al. | |
| 2009/0195638 A1 | 8/2009 | Caspi et al. | |
| 2009/0244278 A1 | 10/2009 | Taneja et al. | |
| 2009/0254843 A1 * | 10/2009 | Van Wie | G06F 3/04815 715/757 |
| 2009/0285131 A1 * | 11/2009 | Knaz | H04N 7/15 370/260 |
| 2009/0319912 A1 | 12/2009 | Serr et al. | |
| 2009/0319916 A1 | 12/2009 | Gudipaty et al. | |
| 2010/0075287 A1 | 3/2010 | Dohrmann | |
| 2010/0121566 A1 | 5/2010 | Joshi et al. | |
| 2010/0125353 A1 * | 5/2010 | Petit-Huguenin | H04L 45/16 700/94 |
| 2010/0165072 A1 | 7/2010 | Oike | |
| 2010/0169791 A1 * | 7/2010 | Pering | G06F 3/1423 715/740 |
| 2010/0318921 A1 * | 12/2010 | Trachtenberg | G06Q 10/10 715/751 |
| 2011/0038472 A1 | 2/2011 | Gartner et al. | |
| 2011/0074915 A1 | 3/2011 | Ferren et al. | |
| 2011/0096138 A1 * | 4/2011 | Grimshaw | H04N 7/15 348/14.08 |
| 2011/0102539 A1 * | 5/2011 | Ferren | H04N 21/4314 348/14.08 |
| 2012/0050323 A1 | 3/2012 | Baron, Jr. et al. | |
| 2012/0102111 A1 * | 4/2012 | Salesky | H04L 65/403 709/204 |
| 2012/0162266 A1 * | 6/2012 | Douglas | G06F 3/0481 345/677 |
| 2012/0162351 A1 * | 6/2012 | Feldman | G06F 3/1423 348/14.03 |
| 2012/0176465 A1 * | 7/2012 | Triplett | H04N 7/15 348/14.07 |
| 2012/0216129 A1 * | 8/2012 | Ng | G06Q 10/00 715/753 |
| 2012/0229589 A1 | 9/2012 | Barrus | |
| 2012/0258434 A1 * | 10/2012 | Coda | G06F 9/451 434/322 |
| 2012/0284635 A1 | 11/2012 | Sitrick et al. | |
| 2012/0284747 A1 | 11/2012 | Joao | |
| 2012/0296914 A1 | 11/2012 | Romanov et al. | |
| 2012/0314018 A1 | 12/2012 | Wengrovitz et al. | |
| 2012/0327173 A1 | 12/2012 | Couse et al. | |
| 2013/0050398 A1 | 2/2013 | Krans et al. | |
| 2013/0057640 A1 | 3/2013 | Callahan | |
| 2013/0063542 A1 | 3/2013 | Bhat et al. | |
| 2013/0091205 A1 * | 4/2013 | Kotler | H04L 65/403 709/204 |
| 2013/0091440 A1 * | 4/2013 | Kotler | G06Q 10/10 715/753 |
| 2013/0093838 A1 | 4/2013 | Tan et al. | |
| 2013/0103446 A1 * | 4/2013 | Bragdon | G06Q 10/109 705/7.15 |
| 2013/0117018 A1 * | 5/2013 | O'Sullivan | G10L 15/26 704/235 |
| 2013/0162753 A1 | 6/2013 | Hendrickson et al. | |
| 2013/0227433 A1 * | 8/2013 | Doray | G06F 3/0481 715/753 |
| 2013/0275883 A1 * | 10/2013 | Bharshankar | H04L 67/1095 715/753 |
| 2013/0290422 A1 | 10/2013 | Kumagai et al. | |
| 2013/0290874 A1 | 10/2013 | Tan et al. | |
| 2013/0305167 A1 | 11/2013 | Bastide et al. | |
| 2013/0335508 A1 | 12/2013 | Mauchly | |
| 2014/0003450 A1 | 1/2014 | Bentley et al. | |
| 2014/0003652 A1 | 1/2014 | Fedorovskaya et al. | |
| 2014/0025740 A1 | 1/2014 | Jaudon et al. | |
| 2014/0040781 A1 | 2/2014 | Epstein | |
| 2014/0098128 A1 | 4/2014 | Fein et al. | |
| 2014/0132701 A1 * | 5/2014 | Wang | H04L 12/1827 348/14.08 |
| 2014/0139609 A1 * | 5/2014 | Lu | G06T 11/60 348/14.03 |
| 2014/0176663 A1 | 6/2014 | Cutler et al. | |
| 2014/0214938 A1 | 7/2014 | Bhatt et al. | |

(56) References Cited

U.S. PATENT DOCUMENTS

| | | |
|---|---|---|
| 2014/0267545 A1 | 9/2014 | Paripally et al. |
| 2014/0300684 A1 | 10/2014 | Fagadar-Cosma et al. |
| 2014/0362163 A1* | 12/2014 | Winterstein ............ G06T 5/002 |
| | | 348/14.07 |
| 2014/0366091 A1 | 12/2014 | Savage et al. |
| 2015/0015504 A1* | 1/2015 | Lee ........................ G06F 3/017 |
| | | 345/173 |
| 2015/0049162 A1 | 2/2015 | Kurupacheril et al. |
| 2015/0085058 A1 | 3/2015 | Zhang et al. |
| 2015/0154445 A1 | 6/2015 | Biswas et al. |
| 2015/0163362 A1 | 6/2015 | Dickins et al. |
| 2016/0277712 A1 | 9/2016 | Michot |
| 2020/0340299 A1 | 10/2020 | Snader et al. |

* cited by examiner

Conference Paradigm Rule Set

| Paradigm | Participant Sophistication | Action | |
|---|---|---|---|
| (P1) Presentation | Sophisticated | (Action 1) | Obtain existing presentation content from queued presentation materials |
| | | (Action 2) | Obtain real time verbal annunciations from presenter |
| | | (Action 3) | Search for supplemental content based on obtained annunciations and presentation content |
| | | (Action 90) | Select detailed supplemental content |
| | | (Action 4) | Present supplemental content via secondary background portions of emissive surface(s) |
| | Intermediate | (Action 1) | Obtain existing presentation content from queued presentation materials |
| | | (Action 2) | Obtain real time verbal annunciations from presenter |
| | | (Action 3) | Search for supplemental content based on obtained annunciations and presentation content |
| | | (Action 91) | Select intermediate level supplemental content |
| | | (Action 4) | Present supplemental content via secondary background portions of emissive surface(s) |
| | Unsophisticated | (Action 1) | Obtain existing presentation content from queued presentation materials |
| | | (Action 2) | Obtain real time verbal annunciations from presenter |
| | | (Action 3) | Search for supplemental content based on obtained annunciations and presentation content |
| | | (Action 92) | Select low level supplemental content |
| | | (Action 4) | Present supplemental content via secondary background portions of emissive surface(s) |
| (P2) Generation . . . | | | |

Fig. 9

INFERRED ACTIVITY BASED CONFERENCE ENHANCEMENT METHOD AND SYSTEM

CROSS-REFERENCE TO RELATED APPLICATIONS

This application is a continuation of U.S. patent application Ser. No. 15/916,769, which was filed on Mar. 9, 2018, which is a continuation of U.S. patent application Ser. No. 15/276,089, which was filed on Sep. 26, 2016, which is a continuation of U.S. patent application Ser. No. 14/617,320 which was filed on Feb. 9, 2015, which claims the benefit of U.S. Provisional patent application Ser. No. 61/939,535, which is titled "INFERRED ACTIVITY BASED CONFERENCE ENHANCEMENT METHOD AND SYSTEM" and was filed on Feb. 13, 2014, each of which is incorporated herein by reference.

STATEMENT REGARDING FEDERALLY SPONSORED RESEARCH OR DEVELOPMENT

Not applicable.

BACKGROUND OF THE DISCLOSURE

The present disclosure relates to systems for inferring conferee communication paradigms of conferees participating in a conference session and using the inferred paradigms to enhance a conference session in some fashion and more specifically to a system that identifies conference characteristics in a conference space and uses those conference characteristics to infer paradigms where instantaneous paradigms are used to determine how best to enhance the session.

Conference rooms or spaces and related electronic tools have evolved to facilitate information sharing among groups of people. For instance, most conference spaces include one or more conference tables and associated chairs located in a walled off space and one or more large upright surfaces for sharing information, the large surfaces typically arranged at locations for optimal viewing by persons located about the conference table(s). In many cases the large surface areas for sharing now comprise one or more large digital electronic display boards or emissive surfaces for sharing digital content (e.g. documents, application program output, videos, etc.). In many cases electronic boards are touch sensitive so that users can interact with and generate content via touch action similar to the way whiteboards and chalk boards have been used in the past.

One tool type that is almost always now present in conference spaces includes portable personal computing devices like laptops, tablet computing devices, smart phones, etc., that can be used by conferees to enhance a conference session in several different ways. First, a personal device may be used to help supplement a conferee's personal understanding of presented content. For instance, if a conferee does not know what a specific acronym used in a presentation stands for, the conferee can independently search for the acronym via the internet during a session and locate the meaning without disturbing the rest of the session conferees.

Second, a personal device may be used to obtain supplemental information about a session topic or some other related topic that may be of interest to a group of session conferees. For instance, in many cases during a session, conferees may, based on content presented in a conference space, be reminded of additional content that may be useful or may generate new ideas about content that may be useful to a session group. In many of these cases a conferee may be inclined to search for additional relevant or at least interesting content. Once a conferee locates content that she would like to share with a group, in at least some cases the conferee may be able to replicate the content on one of the common emissive surfaces within the conference space to share that content.

Third, a personal device may enable conferees to modify the content stored as part of session content. For instance, where a session is set up for five conferees to work together to collaboratively generate session work product, personal devices may enable conferees to add or change content in a session file so that all conferees that can access the session file have access to the same versions of conference content. In some cases personal devices operate in parallel with touch sensitive common emissive surfaces for manipulating session content.

Fourth, personal devices often enable conferees to obtain content generated by the session group or shared by other conferees during a conference session to be stored in a persistent fashion for subsequent use. For instance, a conferee may be able to replicate at least a subset of conference content on the conferee's personal device for device or remote storage by the conferee for personal use.

While functions facilitated by personal devices in a conference session are often advantageous, such functionality often has shortcomings. First, conferee supplementation during a session, by its very nature, requires conferees to turn their attention away from content currently presented or discussed to some peripheral idea or concept. When one conferee is tracking down supplemental content, that conferee necessarily misses some communication that occurs. When several conferees track down supplemental content simultaneously, clear communication can be hampered appreciably.

Second, conferees that search for supplemental content do so based on their own perspective and therefore, while search results may be particularly useful to a conferee that performs a search, the results may not be useful and may in fact be confusing to other session conferees when shared. For instance, a first conferee may have a PhD in molecular biology while other conferees have no scientific background on which to draw. Here, a first conferee's search may generate content for which a detailed understanding of biology is required and which the other conferees would have difficulty understanding at best. If the first conferee shares results of the detailed search with others, the sharing action would likely have the adverse effect of confusing other conferees rather than helping in their understanding of some topic. Here, most of the conferees would require at least a second round of supplemental information to understand the supplemental information that the first conferee shares. On the other hand, if one of the other conferees performed some search for content related to biology, the results would likely be useless to the first conferee that has the PhD. The problem here is that in many cases conferees have no idea of the skill level of other conferees in a group and therefore are often unable to take skill level into account when identifying content to be shared.

Third, optimal types of content supplementation and optimal ways in which supplemental content is shared with a session group often relate to the types of communication (e.g., conferencing paradigms) that occur within a conference space. For instance, during a first session a single conferee may make a presentation during which other conferees act as an audience and during a second session a group of five conferees may collaborate to generate new content or work product. During a presentation of pre-generated content, content supplementation by other conferees would be distracting at best while such supplementation would be expected and in many cases required during collaborative content generation. Most conferees do not even understand that different conferencing paradigms exist and therefore cannot optimize supplemental content or ways to share the supplemental content.

Fourth, in many cases conferencing paradigms change during a session and therefore content supplementation and ways of sharing should likewise change to optimize effect. Here, for most conferees that do not even understand the different conferencing paradigms that occur, there is no hope of distinguishing one paradigm from another and optimizing content supplementation and ways to supplement based thereon.

BRIEF SUMMARY OF THE DISCLOSURE

It has been recognized that a conferencing server can be programmed to supplement conferencing content in optimized ways based on a discerned conferencing paradigm that, while present, may be difficult or distracting for conferees to perceive. To this end, it has been recognized that people use several different conferencing paradigms when working in a conference space. Herein, the term "paradigm" is used to refer to a communication or activity mode with a space. For instance, in some cases a conference session may consist primarily of information presentation where one conferee presents information to others within a conference space. As another instance, a group of conferees may collaborate together to brainstorm and generate content during a session in a generally free form fashion. In still other instances small groups of conferees may form within a conference space to co-evaluate different or even the same content within a conference space. Other conferencing paradigms are contemplated.

In the case of a presentation conferencing paradigm, it is often optimal for supplemental content to be focused solely or predominantly on content presented by a presenting conferee as opposed to any content that any conferee may find interesting to help keep conferees focused on the information being presented.

In addition, in the case of a presentation conferencing paradigm, it is often optimal for supplemental content to be shared in "background" spaces within a conference space so that the content can be referenced without disrupting presentation of the main content being presented by the presenter. In a conference space that includes first, second and third large flat emissive surfaces on a left wall, a central wall and a right wall, respectively, a background space may include one of the first (e.g., left) or third (e.g., right) emissive surfaces while main presentation content is presented on the central or second emissive surface. In other cases a background space may include a portion of one of the left or right emissive surfaces, a side portion of a main or central emissive surface, a portion of the central emissive surface along the top edge thereof (e.g., a ribbon), etc.

Moreover, in the case of a presentation conferencing paradigm, because pre-generated content is being presented, it may be advantageous to prohibit any conferee from modifying content by either adding supplemental content or by altering presented content.

In the case of a content generation conferencing paradigm, it is often optimal for supplemental content to be more broadly based than the content currently presented within a conference space to help conferees think more broadly and generate new ideas. Here, for instance, automated search queries may be based on currently presented content, other information associated with a conference such as previously presented content, content yet to be presented but perhaps stored in a session queue for subsequent discussion, content stored in conferee files related to the session, content related to expertise and prior experiences of session conferees, archived information related to other sessions or related to similar topics in one or more company databases, etc.

In addition, in the case of a content generation conferencing paradigm, it is often optimal for supplemental content to be shared in a more prominent location than a background space within a conference space so that the content is more front and center for conferees to help trigger new ideas. In a conference space that includes first, second and third large flat emissive surfaces on a left wall, a central wall and a right wall, respectively, a more prominent location may include a left one fourth of the central or second emissive surface. In other cases the more prominent location may include a virtual window centrally located within the central emissive surface which either moves to the side after a short period or that can be quickly moved to a less prominent location via a gesture (e.g., a swiping action) from one of the conferees.

Moreover, in the case of a content generation paradigm, interfaces may be automatically presented on personal portable devices for conferees to share content via common emissive surfaces. This should be contrasted with the presentation paradigm described above where, in at least some cases, conferees may not be provided with content sharing tools as the system attempts to maintain conferee focus on presented content as opposed to new content generation. In this regard see U.S. patent application Ser. No. 14/053,213 titled "Egalitarian Control Apparatus And Method For Sharing Information In A Collaborative Workspace" which describes a virtual interface overlay that can be presented over a desktop image on a laptop or other portable device for sharing the desktop by replication on a common display. An interface akin to the overlay may be presented in some systems according to the present disclosure when sharing is encouraged. The '213 application is incorporated herein by reference in its entirety.

In the case of a co-evaluation conferencing paradigm, an intermediate level of content supplementation may be appropriate based on currently presented content as well as content presented previously during a conferencing session. In addition, in the case of a co-evaluation conferencing paradigm, supplemental content may be shared in a third space that is neither background nor front and center (e.g. to the side on a central emissive surface) so that the content is accessible and can be considered but is not front and center.

In addition, in the case of a co-evaluation conferencing paradigm, the system may provide tools for conferees to evaluate content without changing the underlying content itself. Again, this should be contrasted with the presentation and generation paradigms where conferees are unable to change or evaluate content and where conferees can change content in any fashion, respectively, in at least some embodiments.

In at least some embodiments of the present disclosure sensor devices may be used to sense session characteristics that are then analyzed to discern conferencing paradigms within a conference space. For instance, in at least some embodiments one or more cameras may be used to sense conferee presence, location, orientation, relative position with respect to other conferees, conferee positions with respect to furniture artifacts or presented information on emissive surfaces, posture, etc. Hereinafter, unless indicated otherwise, these positional types of sensed information will be referred to as "juxtaposition information". Once juxtaposition information is determined for conferees in a space, conferencing paradigm rules may be applied to the juxtaposition information to discern a current conferencing paradigm. For instance, where a first conferee is located at the front of a conference space proximate a central large emissive surface and others are arranged about the conferencing space and are oriented to face the first conferee, the server may apply the conferencing paradigm rules to determine that a presentation conferencing paradigm is occurring.

As another instance, where multiple conferees are routinely moving to and from a common emissive surface and adding content to the surface, the server may determine that a content generation conferencing paradigm is occurring. Other paradigms and far more complex rule sets for discerning a current paradigm based on sensed session characteristics are contemplated.

In at least some embodiments one or more Microsoft Kinect sensing devices may be employed to sense the juxtaposition information. The Kinect devices includes a horizontal bar that can be mounted to the top of a display, at a ceiling location, or to some other mechanical support. The Kinect device features a camera and a depth sensor which provide full-body 3D motion capture and facial recognition. The depth sensor consists of an infrared laser projector combined with a monochrome CMOS sensor, which captures video data in 3D under any ambient light conditions. The sensing range of the depth sensor is adjustable and Kinect software is capable of automatically calibrating the sensor based on physical environment to accommodate the presence of furniture or other obstacles. A Kinect device is capable of simultaneously tracking up to at least six people and may only be limited by how many people fit in a field-of-view of the device camera in at least some cases.

In at least some embodiments a server may be programmed to use the depth information generated by the Kinect device or similar sensing device to identify conferees, determine conferee locations and general posture information such as whether or not conferees are sitting or standing, the orientations of the conferees, gestures by the conferees, etc.

In addition to cameras, other sensor devices may be arranged within a conference space to generate information useable by the server to discern a conferencing paradigm. For instance, one or more microphones may be arranged within a conference space to capture words spoken by conferees within the space. In at least some cases the captured audio may be used to discern which conferee is speaking based on triangulation or some other technique. Who is speaking can be used along with juxtaposition information to discern a conference paradigm. For instance, if a first conferee within a conference space generates at least 80% of the words sensed during a session period, the server may be programmed to discern a presentation conferencing paradigm regardless of the location of the first conferee relative to the other conferees. Similarly, if a first conferee within a space generates more than 60% of the words sensed during a session period and is at a central or main presentation location in front of a primary emissive surface during the period, the server may be programmed to discern a presentation conferencing paradigm.

Kinect devices include microphones and either include voice recognition capabilities or generate data that can be analyzed using a voice or speech recognition engine and therefore where voice needs to be sensed, one or more Kinect devices may be used to sense voices within a conference space and associate those voices with specific conferees within the space.

In some cases content used to generate search queries may be limited to content associated with specific conferees. For instance, in the case of a presentation conference paradigm, only words spoken by a presenting conferee may be used to generate search queries and words spoken by other conferees may be disregarded. Where conferees break out into smaller groups during content generation, search queries may be based on words spoken by conferees within a small group as opposed to words spoken by any conferee within a larger conference space. As another instance, where conferees participate in a content generation session, words spoken by all conferees may be used to automatically generate content queries and generate content for all conferees.

In still other embodiments other position sensing devices may be used to discern juxtaposition information. For instance, proximity sensors may generate information useable to determine that most conferees are arranged about a conference table and a Kinect or other type of camera device may be used to determine juxtaposition information for one or more conferees proximate a central common emissive surface. This information combined with a space entry sensor that can be used to count conferees within a space may be used to determine that all but one conferee in a space is arranged about a table and that the other conferee is in a main presentation location proximate a central common emissive surface to discern a presentation conference paradigm.

In some embodiments content and other information associated with each conferee may be stored in a database accessible to a system server and sensors for sensing conferee identity within a conference space may be positioned within the space. Here, after a system server determines identities of conferees within a space, the server may tune system operation based on conferee identities. For instance, the server may tune or adjust search queries or results of queries to be presented to conferees as a function of conferee identities. For example, in a presentation conference paradigm, the system may present supplemental information based on expertise of the conferees within a space. On one hand, where most conferees only have a basic level of understanding of the content being presented, the system may obtain and present only basic supplemental content. On the other hand, where most conferees are experts in content being presented, the system may obtain and present more detailed supplemental content understandable by most conferees within the space.

In at least some embodiments it is contemplated that different supplemental content may be presented to different conferees or sets of conferees within a space depending on their expertise and/or on the conference paradigms occurring in a space. For instance, where one or more conferees uses a personal computing device like a laptop, a tablet computer, a smart phone, etc., while the system presents supplemental content that is optimized for all conferees on a common emissive surface, the system may present supplemental content that is more optimized for a particular conferee on the conferee's personal device. For example, an expert in presented content may be presented with supplemental content on her device that others in a session would likely have difficulty understanding.

As another instance, where conferees break out into small groups to discuss a specific topic, supplemental content presented to the small groups may be different based on the level of expertise within the small groups. A group of PhDs fluent in content being considered may be presented with relatively complex supplemental content on a left emissive surface around which the group is gathered while a group of conferees less knowledgeable about content gathered around a right emissive surface may be presented with a more basic level of supplemental information.

At a high level, system operation can be modified based on different general types of session characteristics such as, for instance, passive or instantaneous characteristics such as conferee locations, orientations, relative juxtapositions to other conferees, furniture artifacts, presented content, etc., and active or changing characteristics such as annunciated or voiced words, conferee gestures, conferee manipulation or generation of content, changing juxtapositions of conferees, etc. Modifications to system operation can also be related to archived content as well as temporal and spatial relationships to content and active characteristics. For instance, during a session, two annunciated comments by one conferee within two minutes of each other may be more closely tied together by a system server when formulating an automated search query than if the same two comments were made with an hour long period there between. As another instance, two phrases added to an emissive surface proximate each other may be considered relatively more related than the same two phrases added to different and spaced apart emissive surfaces within a conference space.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

BRIEF DESCRIPTION OF THE SEVERAL VIEWS OF THE DRAWINGS

FIG. 9 is another exemplary conference paradigm rule set diagram used to implement at least some methods consistent with the present disclosure;

Figure 1:
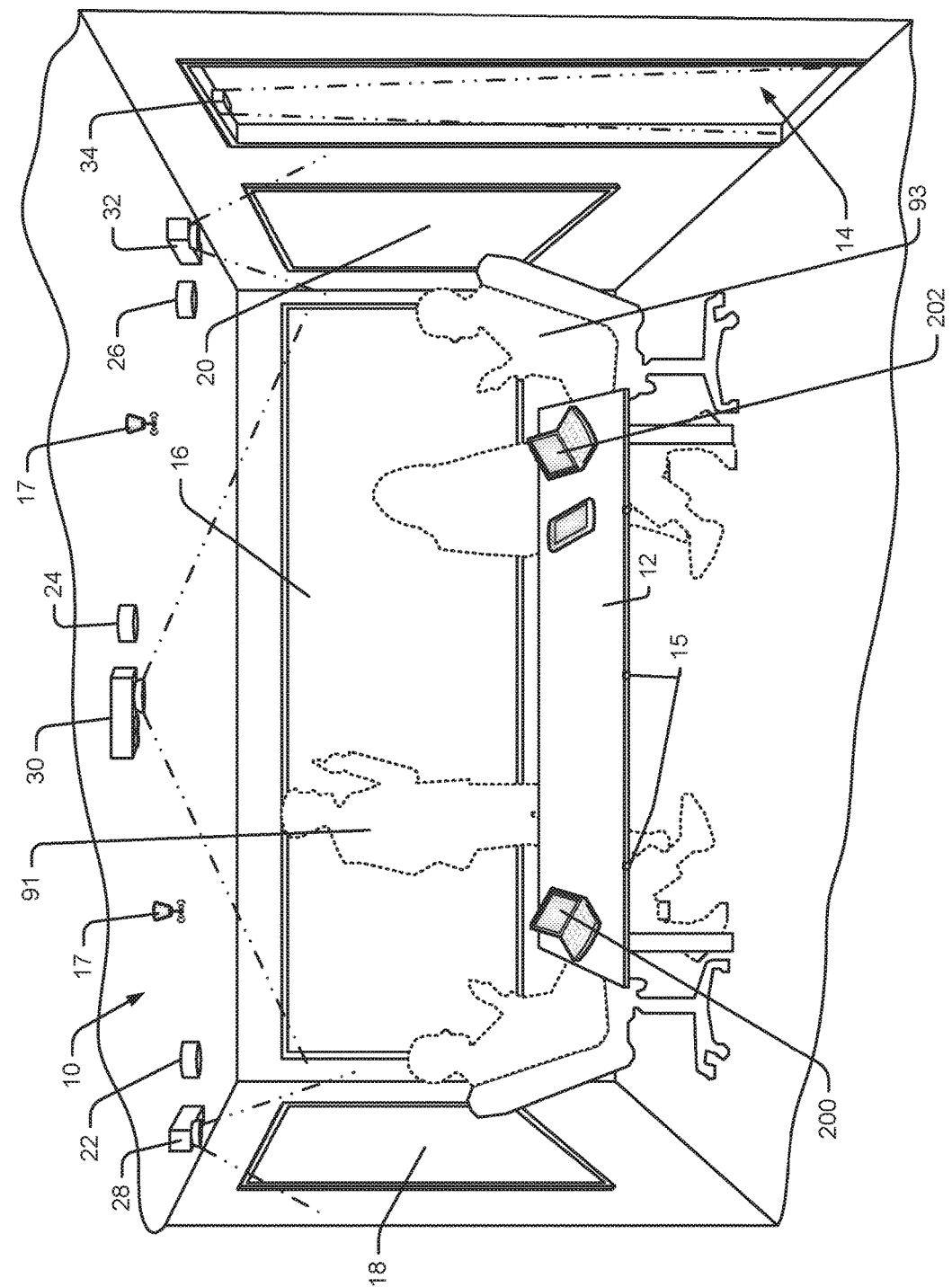
FIG. 1 is a schematic view showing a conferencing space including sensor devices used to facilitate at least some methods that are consistent with various aspects of the present disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE DISCLOSURE

The various aspects of the subject disclosure are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The phrase "computer readable media" can include but is not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring now to the drawings wherein like reference numerals correspond to similar elements throughout the several views and, more specifically, referring to FIG. 1, the present disclosure will be described in the context of an exemplary conference room that is defined, in general, by a plurality of walls that strike off a conference space 10 from a surrounding environment. In FIG. 1, three room walls, a floor and a ceiling are shown but not labelled. It should be appreciated that a fourth or additional walls would enclose space 10. An entry way/egress 14 is formed in one of the side walls for entering and exiting space 10 and may include a door of some type.

Referring still to FIG. 1, a conference table 12 and a set of chairs (not labeled) are provided within space 10 to accommodate conferees during conference activities. The exemplary table 12 forms a top work surface for use by conferees and is generally centrally located within space 10 with the conferee chairs arranged there around. The table and chairs are generally referred to herein as furniture artifacts. While only simple furniture artifacts are shown in FIG. 1, other artifacts and artifact arrangements are contemplated.

Figure 11:
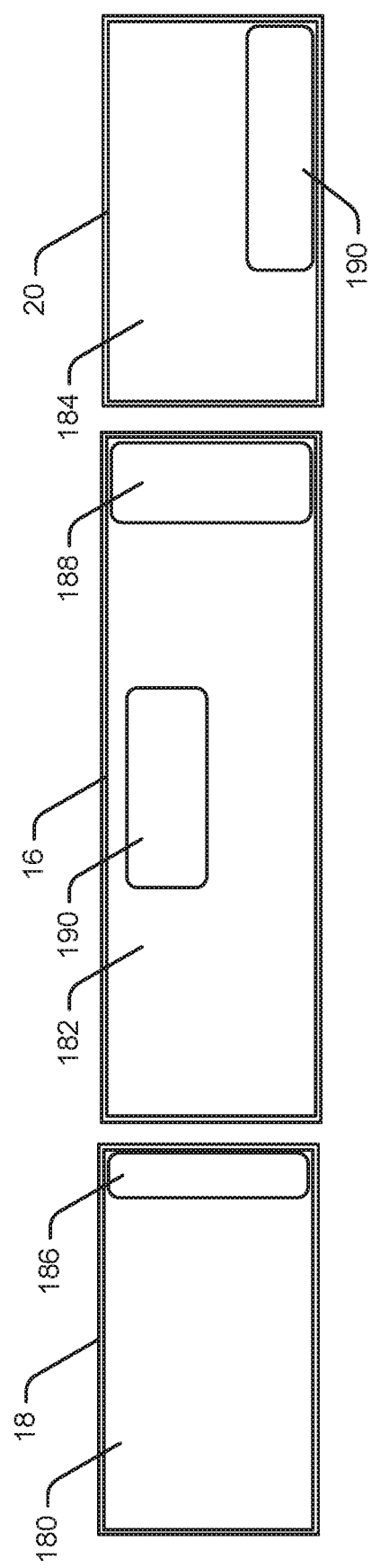
FIG. 11 is a schematic diagram illustrating the three large emissive surfaces of FIG. 1 albeit shown in a flat plan view.

Three large electronic whiteboard or touch sensitive emissive surfaces are mounted to the three illustrated walls including a central emissive surface 16, a left emissive surface 18 and a right emissive surface 20. Herein, unless indicated otherwise, it will be assumed that each of the emissive surfaces 16, 18 and 20 is a large electronic display board that can operate in a fashion similar to a computer monitor to present content to conferees within space 10. Each surface 16, 18 and 20 can be divided into separate subspaces or virtual windows for presenting content to conferees. For instance, see also FIG. 11 that shows the surface 18, 16 and 20 in a laid flat view where each surface includes a large areas 180, 182 and 184, respectively, and where smaller windows 186, 188, 190 and 192 are provided on the surfaces. It will also be assumed that each of the emissive surfaces 16, 18 and 20 is touch sensitive so that conferees within space 10 can contact the front surfaces thereof to interact with software driving the surfaces and to create content via various application programs run by a system server (see 60 in FIG. 3) or other servers or processors that are linked to the system. Thus, each of the emissive surfaces 16, 18 and 20 can operate as an input device as well as an output device to facilitate content sharing.

Referring still to FIG. 1, wireless access points 17 are shown mounted to the ceiling for receiving and transmitting wireless information from and to personal computing devices located within space 10. To this end, see that exemplary laptop computers 200 and 202 and a tablet type device 204 used by conferees are located on the top surface of table 12. Here, users of devices 200, 202 and 204 may communicate with a system server to perform various content sharing tasks, access content, search the Internet or other networks or databases, etc., in a wireless fashion. In at least some cases portable devices 200, 202, etc., may be used to control content on one or each of the emissive surfaces 16, 18 and 20. For instance, movement of a cursor about on a display of one of the portable devices 200, 202 may cause a replicated cursor to move about on one of the common surfaces 16, 18 or 20.

Referring yet again to FIG. 1, various types of sensor devices are provided within space 20 to sense various session characteristics as well as session content. Here, the phrase session content refers to any content that is shared in any fashion during a conferencing session. For example, all content presented via emissive surfaces 16, 18 and 20 includes session content. Exemplary session content that may be shared via the emissive surfaces includes the information in documents shared via the surfaces, in videos shared via the surfaces, in images created using the surfaces, etc.

The phrase "session characteristics" refers to non-content based characteristics of the session. For instance, conferee presence within a conference space, locations of conferees within space, relative juxtapositions of conferees within conference space 10, are all session characteristics. As another instance, which conferee is speaking or is presenting information via one of the emissive surfaces is an exemplary session characteristic. The relative juxtaposition of a conferee with respect to specific content on one or more of the emissive surfaces may also be a session characteristic. Relative juxtapositions of different subsets of content on the emissive surfaces may be a session characteristic. Relative juxtapositions of a conferee that annunciates words and content on one or more common emissive surfaces may comprise a session characteristic. For instance, if a conferee is proximate and oriented toward a specific portion of an emissive surface including a specific set of content when the conferee annunciates a set of words, the system may associate the annunciated words with the specific set of content and recognize the association as a session characteristic. Juxtapositions of sub-groups of conferees within space 10 that may indicate smaller breakout groups maybe a session characteristic. Many other session characteristics are contemplated.

Exemplary sensors for sensing session content include ceiling mounted microphones 22, 24 and 26 as well as emissive surfaces 16, 18 and 20. The microphones 22, 24 and 26 can be used to sense conferee voices within space 10 and voice recognition software can be used to identify the meaning of voiced words within the space.

Figure 3:
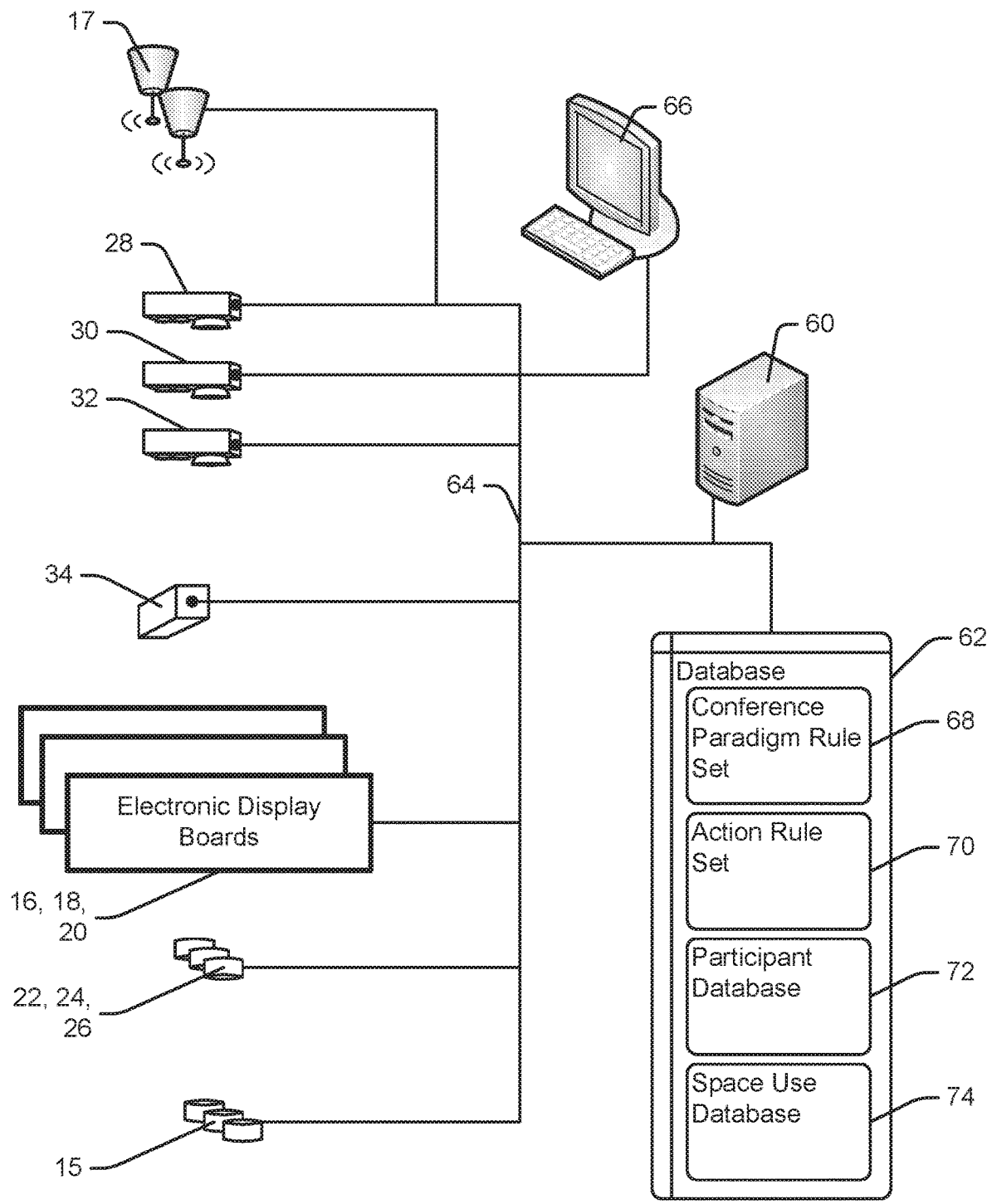
FIG. 3 is a schematic illustrating various hardware components used to implement the disclosed systems and methods.

Emissive surfaces 16, 18 and 20 on which content is displayed are driven by the system server 60 shown in FIG. 3. The session characteristics sensors in FIG. 1 include, among others, ceiling mounted cameras 28, 30 and 32 as well as proximity sensors 15 mounted in the edge of the top member of table 12 and an entry/egress sensor 34 mounted in the header portion of the wall structure that forms egress 14. The cameras 28, 30 and 32 are similarly constructed and operate in a similar fashion and therefore, in the interest of simplifying this explanation, only camera device 30 will be described here in any detail.

Device 30 includes a downwardly directed field of view and obtains images of conferees within space 10 proximate emissive surface 16 and perhaps throughout space 10. In at least some embodiments camera 30 is equipped with hardware suitable for generating depth information that can be used to identify conferees within the field of view, orientation of the conferees within the field of view, gestures, etc. For instance, from above, a conferee will generally appear as a two depth mass including the top of the conferee's head at a first depth and the conferee's shoulders on either side of the head at a second depth within 8 to 16 inches from the top of the head where the head and shoulders will have areas within a range of values. Each time a two depth mass meeting the criteria for a human is identified in top view images, the system server may be programmed to determine that a conferee is at the location of the mass. Other algorithms and processes are contemplated for determining conferee orientations and other spatial information associated with each conferee in obtained images. In at least some embodiments, device 30 comprises a Microsoft Kinect device. Other cameras and image processors are contemplated.

Referring still to FIG. 1, proximity sensors 15 may be provided for sensing when a conferee is proximate a specific portion of the edge of table 12. Other proximity sensors may be arranged within the table 12 or within any of the other mechanical structures or furniture artifacts present within space 10.

Entry sensor 34 senses when a conferees enters or leaves space 10. In this regard, sensor 34 may be a simple proximity sensor driving a simple counter device or software application. Proximity sensors are well known in the art and therefore will not be described here in detail. In other embodiments, the proximity sensor 34 may, in addition to being able to sense conferee entry and exit from space 10, be able to determine the identity of each conferee entering and exiting the space 10. Conferee identity may be determined by interrogating portable conferee devices (e.g., 200, 202 in FIG. 1) that conferees use within space 10 such as, for instance, a conferees laptop, a table computing device, a smart telephone device, etc., upon entry or exit from space 10. For instance, in at least some cases an acoustic, RF or other sensor assembly 34 may cause a personal device to wirelessly transmit conferee identifying information when located within the threshold formed by the entry 14.

Referring still to FIG. 1, in addition to operating as content sensors, microphones 22, 24 and 26 may also generate data useable to identify session characteristic. In this regard, the location from which a voice emanates within space 10 may be determined via a triangulation method as well known in the art or via some other type of statistical analysis of voice signals sensed by the microphones. Where the general area from which a voice emanates in space 10 can be determined from sensed voices, that information may be combined with information from cameras 28, 20 and 32 to clearly identify a specific location and a specific conferee from which the voice emanated. For instance, if sensed voice signals from microphones 22, 24 and 26 can be used to at least determine that a voice emanates from a particular one-quarter of space 10 (e.g., a top left corner in top plan view), if only one conferee is located within that one-quarter of the space and that conferee's location can be confirmed via one or more of the cameras in space 10, the specific location from which the voice emanated and the conferee that generated the voice signal can be determined.

Referring again to FIG. 1, the emissive surfaces 16, 18 and 20 can also be used to generate date useable to identify session characteristic. To this end, when content is added to a portion of emissive surface 16, the location of that particular content and the identity of a conferee that added that content can be determined by the system server used to drive emissive surface 16. This relational information can be stored in a system database (see 62 in FIG. 3) for subsequent use. For instance, in at least some cases automated content searching queries may be generated based on all content generated by a specific conferee that is within a certain relative proximity on the emissive surfaces. Here, the session characteristic related to spatial relationship of content generated by a single conferee is required to formulate an optimal automated query.

In at least some embodiments, other combinations of sensor signals can be used to ascertain session characteristics. For example, if a signal from entry sensor 34 can be used to determine the identity of a first conferee upon entry into space 10, images from the cameras 28, 30 and 32 can be used to track the location of that specific conferee within space 10 during movement within the space and while the conferee remains located within the space 10 (e.g., during the entirety of a two hour conferencing session). When a second conferee enters space 10, signals from sensor 34 can be used to determine the specific identity of the second conferee and images from the cameras can be used to identify the real time location of that second conferee within the space 10. Thereafter, when a voice emanates from the known location of a conferee in space 10, the voice and content associated therewith can be associated with a specific conferee at the emanating location.

Thus, referring again to FIG. 1 where a first conferee is labeled 91 and a second conferee is labeled 93, images from the cameras 28, 30 and 32 can be used to determine when the first conferee 91 is standing proximate emissive surface 16 and the second conferee 93 is sitting adjacent an edge of table 12, when the first and second conferees are facing each other or facing away from each other, and to identify any gestures performed by the first or second conferees. At least the relative juxtapositions of conferees within space 10 shown in FIG. 1 is consistent with a presentation conference paradigm where the first conferee 91 is standing at a main presentation location and the second conferee 93 is sitting at an edge of a table and where the first conferee is facing other conferees while the second conferee 93 is facing the first conferee or content proximate the first conferee.

Figure 2:
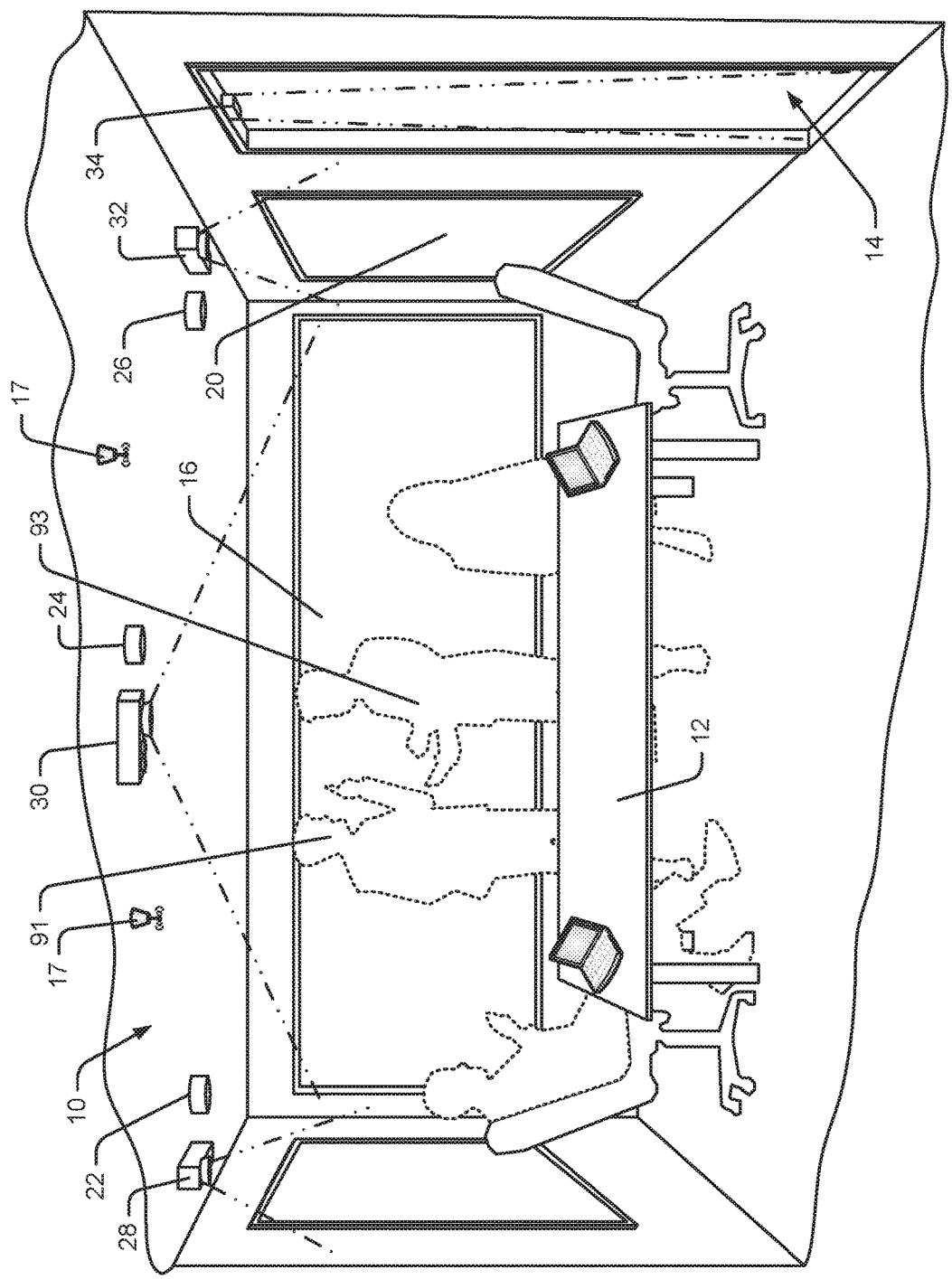
FIG. 2 is similar to FIG. 1, albeit showing conferees within the conference space in different relevant juxtaposition.

Referring to FIG. 2, images from the cameras 28, 20 and 32 can also be used to determine when the second conferee 93 stands up and moves to a location adjacent the first conferee 91, when the conferees are facing each other and any gestures performed by either of the conferees. In FIG. 2, the relative juxtapositions of the conferees 91 and 93 would suggest some conference paradigm other than a pure presentation conference paradigm such as, for instance, co-evaluation of content or perhaps or co-generation of content on emissive surface 16.

Referring now to FIG. 3, a schematic of several of the components used to configure an exemplary system are illustrated. In addition to the access points 17, cameras 28, 30 and 32, entry sensor 34, emissive surfaces 16, 18 and 20, microphones 22, 24 and 26 and proximity sensors 15, the system may also include one or more servers 60, a system administrator's computer 66 and a database 62 stored in a memory accessible by server 60. As shown in FIG. 3, server 60 is linked via a communication link or network 64 to each of the access points 17, sensor devices and output devices. Communication link 64 also links server 60 to database 62 and to the administrator's computer 66. The link 64 may be a hardwired link, a wireless link or some combination of hardwire and wireless. In at least some embodiments, the link 64 includes a local area network, a wide area network, the internet, or some other network configuration known in the art. The server 60 runs various application programs to facilitate methods or processes that are consistent with at least some aspects of the present disclosure.

To define and control the application programs, a system administrator may use computer 66. For instance, while default rules for identifying various known conference paradigms may be provided by a system developer for use by server 60, in at least some cases it is contemplated that a system administrator may want to change those rules or add another set of rules for identifying a different conference paradigm not contemplated by the system developer. This type of customization may be facilitated via the administrator's computer 66. For instance, default rules for the FIG. 1 system may cause query results to be displayed on the left emissive surface 18. An administrator may want to change the location at which query results are displayed to be along a top edge of central surface 16. A commissioning process may be run via computer 66 to make a suitable change to the system so that results are presented via surface 16. Other administrator customization is contemplated.

Referring yet again to FIG. 3, the database 62 may be a separate data storage assembly at the location of server 60 or may be remote and if local may be provided via a memory device internal to server 60. As shown, various rule sets and sub-databases may be provided within database 62. In at least some embodiments, the database includes a conference paradigm rule set 68 and an activity rule set 70. The conference paradigm rule set 68 includes rules for identifying one of several different conference paradigms based on the sensed session characteristics. The activity rule set 70 specifies various activities that server 60 performs based on which conference paradigm is discerned via application of the conference paradigm rule set 68.

Figure 4:
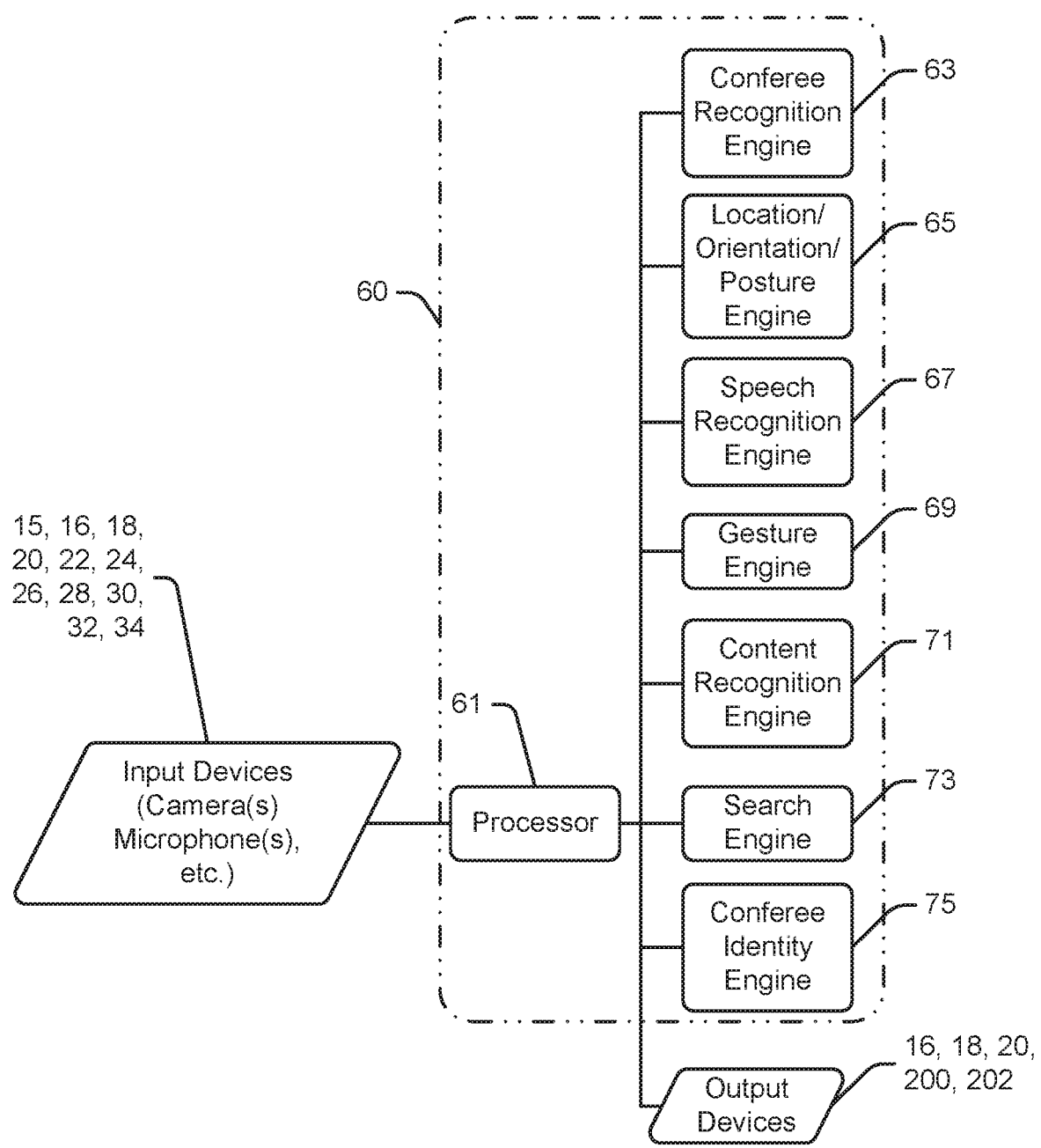
FIG. 4 is a schematic diagram illustrating various aspects of the server, input and output devices showing FIG. 3.

Referring now to FIG. 4, a schematic is provided that illustrates various aspects of server 60. As shown, the server 60 includes a processor 61 that runs software to facilitate various functions based on input from the input devices and also, in at least some cases, based on content presented in a conference space and that generates output via output devices. In this regard, each of the system input devices 15, 16, 18, 20, 22, 24, 26, 28, 30, 32, and 34 feeds the processor 61 and the information therefrom is used by the processor to drive various software engines.

Which software engines are included in a system is a function of how complex the system is and what functional aspects the system provides. The exemplary engines include a conferee recognition engine 63, a location/orientation/posture engine 65, a speech recognition engine 67, a gesture engine 69, a content recognition engine 71, a search engine 73 and a conferee identity engine 75. The conferee recognition engine 63 can be used to recognize a conferee within the field of view of one of the cameras 28, 30 or 32. Algorithms for identifying a conferee within an image based on depth information (e.g., for recognizing dual depth masses that correspond to humans within images) or other types of information in the image are well known in the art and therefore will not be described here in detail. The location/orientation/posture engine 65 also uses information from the cameras to identify location, orientation and/or posture of conferees within the conference space 10.

Speech or voice recognition engine 67 may use any type of standard off the shelf voice recognition software applications such as Dragon's Naturally Speaking software or any of the other well known voice recognition engines on the market. Here, voice sensed by microphones 22, 24 and 26 (see again FIG. 1) may be analyzed via a recognition engine 67 to identify content within voice signals.

Gesture engine 69 uses images from the cameras 28, 30 and 32 to identify conferee gestures within space 10. Algorithms for identifying gestures from camera images are well known in the art and therefore will not be described here in detail.

Content recognition engine 71 is provided to identify different sub-groups of content applied to the emissive surfaces 16, 18 and 20 in FIG. 1. Where server 60 drives emissive surfaces 16, 18 and 20, the content may be gleaned from the information in the server memory used to generate instantaneous images on the surfaces. In some cases server 60 may use optical character recognition to identify textual content in images or image based documents that include text. In some cases the content will be gleaned from meta data associated with content displayed on the emissive surfaces. In addition to obtaining content from the information presented on surfaces 16, 18 and 20 or from meta data associated therewith, content recognition engine 71 may also receive output from the speech or voice recognition engine 67 that can be analyzed to identify content.

Search engine 73 may be any commercially available search engine on the market including the Google search engine, Microsoft's "Bing" engine, or any other engine.

Referring still to FIG. 4, the conferee identity engine 75 includes one or more algorithms for determining the identities of conferees within space 10. In this regard, as discussed briefly above, entry sensor 34 may be used to interrogate conferees' portable electronic devices to determine conferee identity. Other ways of identifying conferee identity are contemplated. For example, upon entry into space 10, where the space 20 is fitted out with microphones, the server 60 may interrogate a conferee and request that the conferee state his or her name to confirm identity. In this case, server 60 may use a speech recognition engine 67 to discern the name spoken by an entering conferee and then link the conferee's identity to the specific conferee within space 10. In other cases where voice signatures are stored for conferees, engine 75 may be usable to identify conferees by comparing speech to stored voice signatures for each possible conferee.

Figure 5:
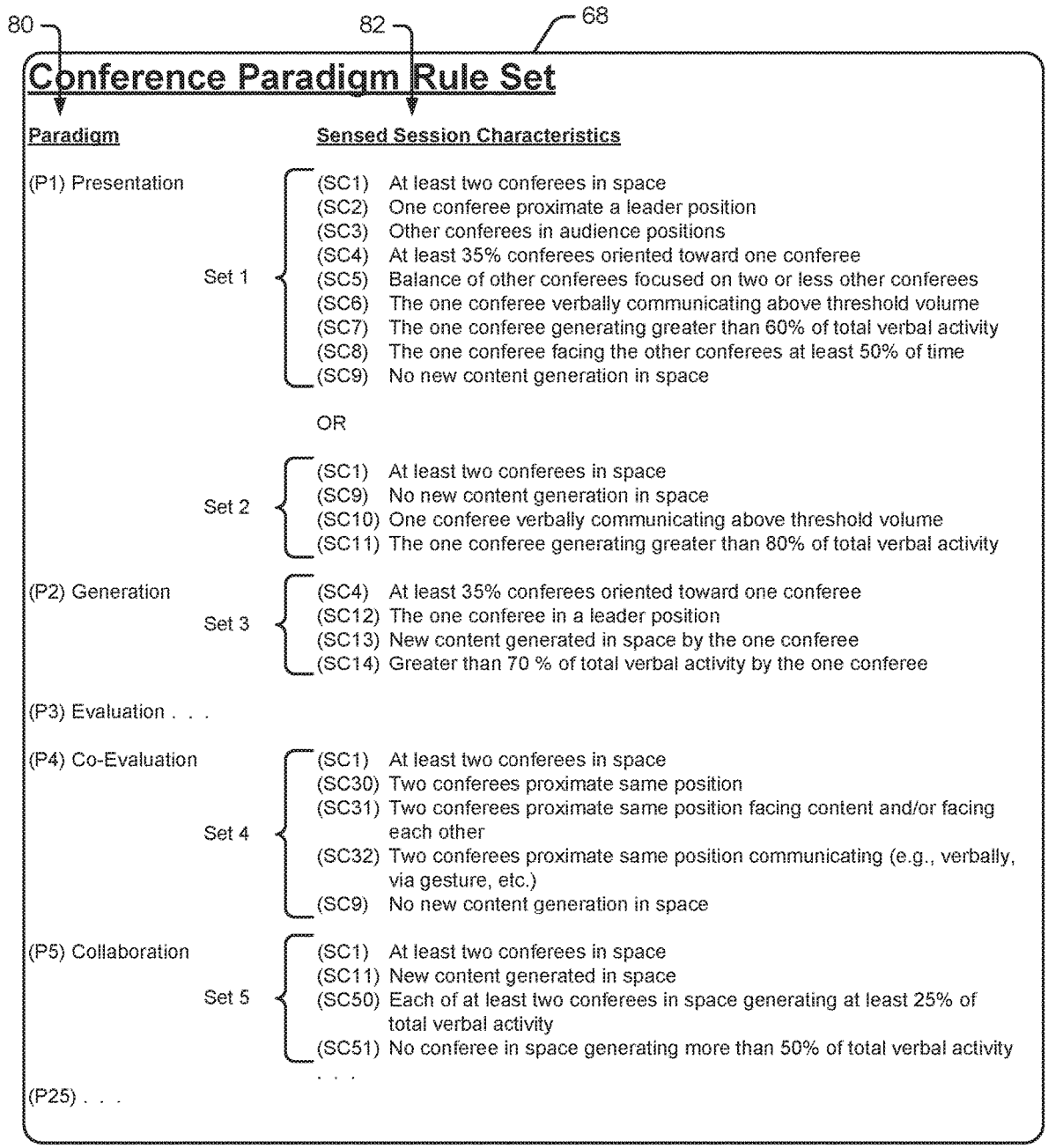
FIG. 5 is a schematic diagram illustrating an exemplary simplified conference paradigm rule set used to implement at least some methods consistent with the present disclosure.

Referring once again to FIG. 3 and now also to FIG. 5, an exemplary conference paradigm rule set 68 shown in FIG. 5 includes a paradigm column 80 and a sensed session characteristics column 82. The paradigm column 80 lists conference paradigms that may occur within space 10. The exemplary conference paradigms in column 80 include a presentation conference paradigm P1, a generation conference paradigm P2, an evaluation conference paradigm P3, a co-evaluation conference paradigm P4 and a collaboration conference paradigm P5. Many other conference paradigms are contemplated as indicated by the P25 entry in column 80.

Here, during a presentation conference paradigm, a single conferee is presenting information to other conferees. While other conferees may make some comments during the presentation or ask questions during the presentation, most of the communication is performed by a single conferee and hence the label "presentation". A generation conference paradigm corresponds to a period during which at least one conferee is generating the majority of new content within a conference space. For instance, one conferee may be using emissive surface 16 as a large electronic whiteboard like a professor in a classroom. An evaluation conference paradigm corresponds to a period during which one conferee is analyzing content, substantially independently of other conferees. A co-evaluation conference paradigm correspond to a period during which two or more conferees are analyzing conference content. A collaboration conference paradigm corresponds to a period during which two or more conferees are working together to generate new content within a conference space. Many other conference paradigms are contemplated.

Referring again to FIG. 5, the sensed session characteristics column 82 includes a sub-set of sensed session characteristics corresponding to each of the paradigms listed in the paradigm column 80. For instance, nine separate sensed session characteristics SC1-SC9 for a first session characteristic set corresponding to the presentation paradigm listed in column 80. The exemplary sensed session characteristics include a first characteristic requiring that at least two conferees be within the conference space 10 (see again FIG. 1). The second characteristic in the first set requires that one conferee be located or be proximate main presentation position (e.g., proximate a central emissive surface 16) within the conference space 10. The third session characteristic in the first set requires that other conferees within the space 10 be to audience positions such as, for instance, proximate edges of conference table 12. The fourth characteristic requires that at least thirty-five percent of the conferees be oriented toward the one conferee that is located at the leader position. The fifth characteristic requires that the balance of the other conferees be focused on two or less other conferees. The sixth characteristic requires that the one conferee (e.g., the conferee at or proximate the leader position) verbally be communicating above a threshold volume at least periodically during a period. The seventh characteristic requires that the one conferee be generating greater than sixty percent of the total verbal activity (e.g., perhaps based on word count, duration of annunciations, etc.). The eighth characteristic requires that the one conferee be facing the other conferees at least fifty percent of the time. The ninth characteristic in the first set requires that no new content (or perhaps only minimal new content) be generated in the conference space 10. In the present example, if each of the characteristics in the first set occurs, the system server will discern that a presentation conference paradigm is occurring.

Referring still to FIG. 5, a second sensed session characteristic set (e.g., set two as shown) is provided as an alternative to the first set wherein, if each of the characteristics in the second set is met, the server may identify a presentation paradigm. The second set includes the first and ninth sensed session characteristics from the first set SC1 and SC9, respectively, as well as two additional session characteristics SC10 and SC11. The tenth characteristic requires that one conferee within the space verbally communicate above a threshold volume and that the one conferee generate greater than eighty percent of the total verbal activity. Here, irrespective of where the one conferee is located, when the second set of characteristics is met, the server identifies a presentation paradigm. In at least some cases there may be third, fourth, etc., alternative characteristic sets associated with one or more of the paradigms.

Referring still to FIG. 5, in the example described above, all nine characteristics SC1-SC9 have to be met in order for the first characteristic set to be recognized and therefore in order to discern that a presentation paradigm is occurring based on the first characteristic set. In other embodiments it may be that any sub-set of a certain number of the first set of characteristics has to be met in order to find a presentation paradigm. For instance, if any six of the nine characteristics SC1 through SC9 occur, a presentation conference paradigm may be identified. In still other embodiments it may be that one sub-set of the first set of characteristics has to occur and a sub-set of a certain number of the balance of characteristics also has to be occur to find a particular paradigm. For instance, in FIG. 5, it may be that characteristics SC1-SC5 have to occur and that at least two of the four characteristics SC6-SC9 have to occur to identify a presentation paradigm.

Referring yet again to FIG. 5, a third characteristic set in column 80 corresponds to the generation conferencing paradigm in column 80, a fourth characteristic set in column 82 corresponds to the co-evaluation paradigm in column 80 and a fifth characteristic set in column 82 corresponds to the collaboration paradigm in column 80. While no characteristic set is shown for the evaluation paradigm in column 80, it should be appreciated that a suitable characteristic set would be provided for identifying an evaluation paradigm.

Figure 6:
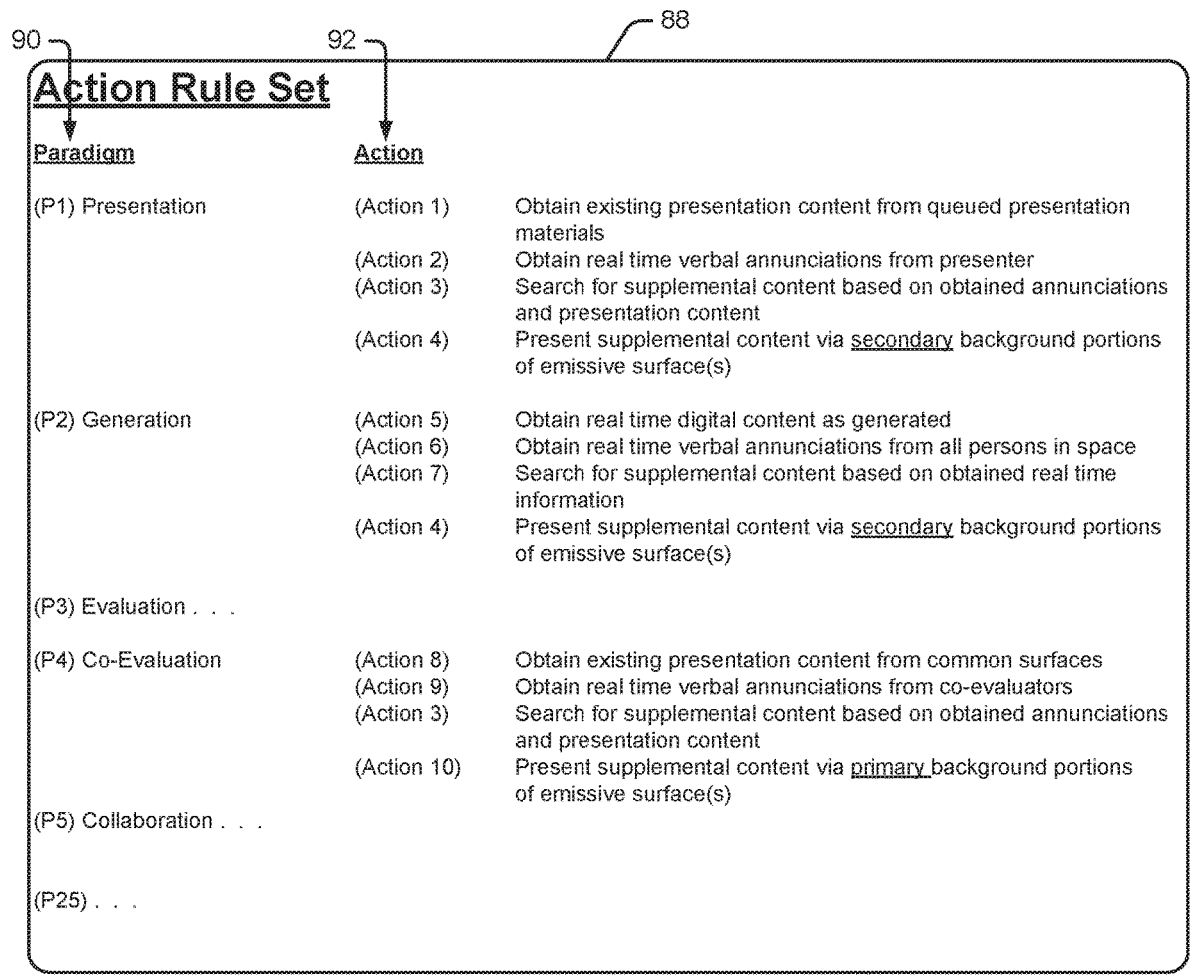
FIG. 6 is a schematic diagram illustrating an exemplary simplified action rule set used to implement at least some methods consistent with the present disclosure.

Referring again to FIG. 3 and now also to FIG. 6, an exemplary action rule set 88 is shown in FIG. 6 which includes a paradigm column 90 and an action column 92. The paradigm column 90, like column 80 in FIG. 5, simply lists each conference paradigm supported by the system. The exemplary paradigms in column 90 includes a presentation paradigm, a generation paradigm, and evaluation paradigm, a co-evaluation paradigm and a collaboration paradigm.

Column 92 includes a list of actions or an action sequence corresponding to each one of the paradigms in column 90 that are to be performed by system server 60 when an associated paradigm in column 90 occurs. For example, when the presentation paradigm in column 90 occurs, the server performs an action sequence comprising four actions including (1) obtaining existing presentation content from queued presentation materials, (2) obtaining real time verbal annunciations from the conferee acting as a presenter of content, (3) searching the internet or other databases for supplemental content based on the obtained annunciations and presentation content, and (4) presenting a supplemental content via a secondary or background portion of one or more of the emissive surfaces 16, 18 and/or 20 within the conference space 10. Thus, during a presentation, any supplemental content searching is based on information being presented by the presenter as well as verbal annunciations by only the presenter and the results of the searching are provided on secondary background portions of the emissive surfaces. Referring again to FIG. 11, secondary background portions may include, for instance, sub-windows 186 and/or 192 on left and right surfaces 18 and 20, respectively, where the presented supplemental content is generally presented to the side for easy referral without being thrust into a location that could disrupt the main presentation of content via surface 16.

Other action sub-sets correspond to each of the other paradigms in column 90. When a co-evaluation paradigm occurs, four actions include (1) obtaining existing presentation content from displayed content on surfaces 16, 18 and 20, (2) obtaining real time verbal annunciations from co-evaluators, (3) searching for supplemental content based on the obtained annunciations and presented content, and (4) presenting a supplemental content via primary background portions of emissive surfaces. Thus, here, the content may be placed in a primary background location as opposed to a secondary background location. For instance, see again FIG. 11 where primary background may be associated with window 190 on surface 16 that is more central than the windows 186 and 192 that correspond to secondary background spaces but that is still generally to the side of main presented content on surface 16. In addition, here, the automated content query is associated with annunciations from co-evaluators as opposed to just annunciations of a single presenter. Many other simple and far more complex action sub-sets are contemplated.

Another content based action may include providing conferee specific content on conferee devices 200, 203, etc., based on paradigms. For instance, if a first conferee is presenting content to others, server 60 may identify the presented subject, search personal databases of the other conferees and present relevant information from the personal databases to specific conferees in a private fashion (e.g., a second conferee may be presented three personal files and a third may be presented four other personal files from their respective personal databases.

In addition to content based actions as shown in FIG. 6, other actions may be performed or controlled by server 60 to enhance a discerned communication paradigm. For instance, server 60 may be linked to a room controller or include software that can provide room management functions such as turning off or adjusting intensity of space lighting, opening or closing motor powered room shades, manipulating phone functions (e.g., turning off ringers) within a conference space, adjusting trajectories of camera fields of view and the sizes of camera fields of view, etc.

Figure 7:
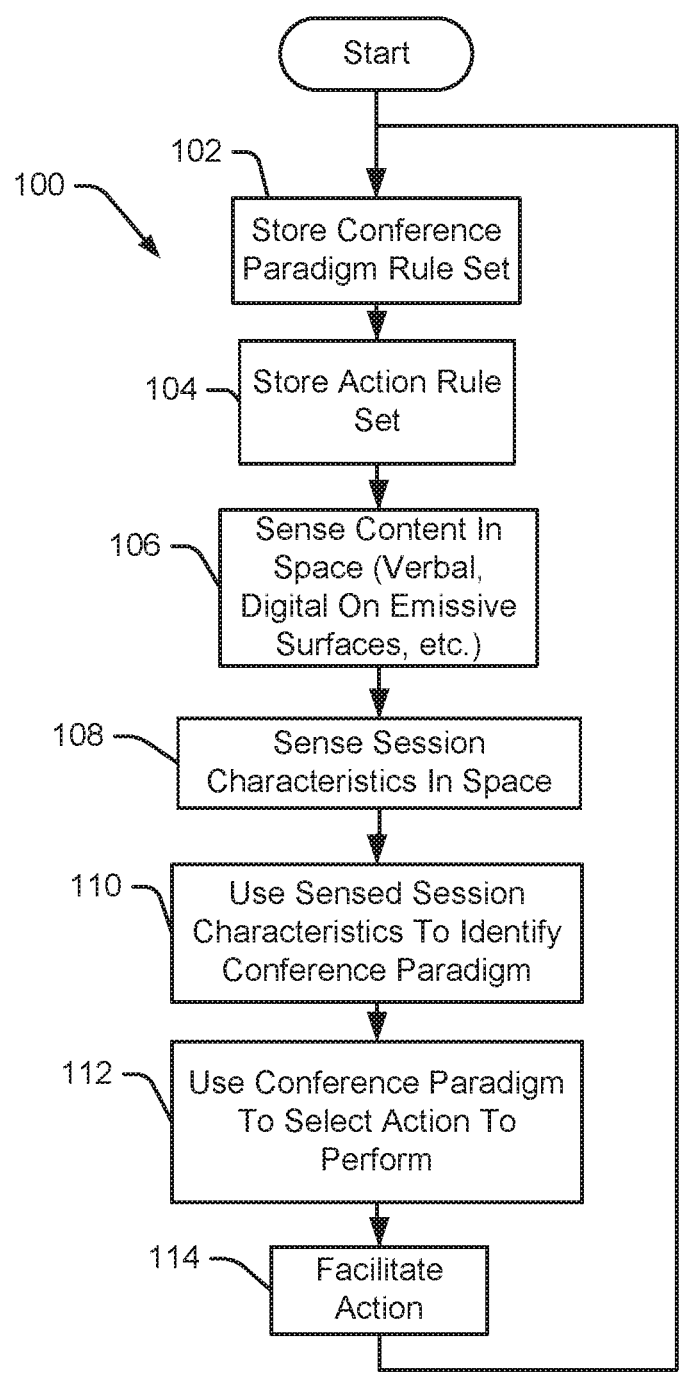
FIG. 7 is a flow chart illustrating one method consistent with some aspects of the present disclosure.

Referring now to FIG. 7, a process for identifying a paradigm and facilitating actions associated therewith that may be performed by server 60 shown in FIG. 3 is illustrated. Referring also to FIGS. 3, 5 and 6, at block 102, a conference paradigm rule set like the one shown in FIG. 5 is stored. At block 104, an action rule set like the one shown in FIG. 6 is stored. At block 106, during a conference session, server 60 received content generated or presented within the conference space. Here, the content received includes content on surfaces 16, 18 and 20 as well as verbal or annunciated content generated by conferees within space 10.

At block 108 server 60 senses session characteristics including relative conferee juxtaposition information, juxtaposition of conferees with respect to presented content, juxtaposition of presented content with respect to other presented content, which conferees are verbally communicating, orientations of conferees, which conferees are making gestures, and any other session characteristics that maybe useful for characterizing conference paradigms. At block 110, server 60 uses the sensed session characteristics to identity an instantaneous conference paradigm.

Figure 12:
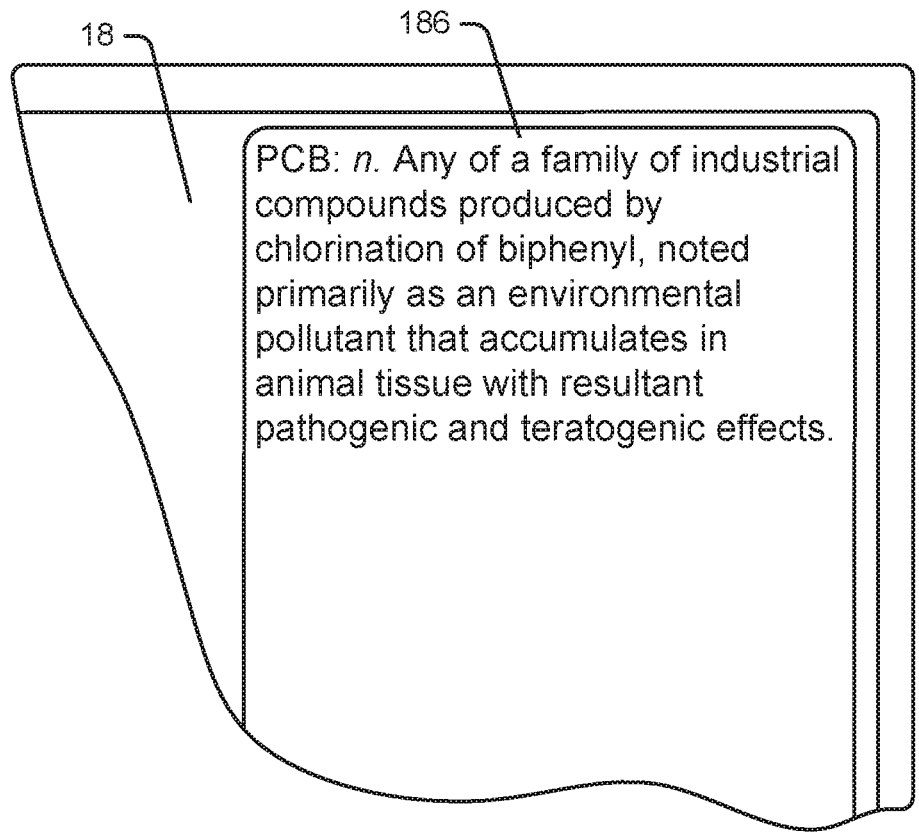
FIG. 12 is a plan view of a portion of one of the emissive surfaces of FIG. 11.

At block 112, server 60 uses the conference paradigm to select actions to be performed by the server 60. For instance, based on the paradigm and the content obtained at block 106, server 60 may perform an automated search query to obtain supplemental information and may present that supplemental information via one or more of the common emissive surfaces 16, 18 and 20 at appropriate and optimized locations. For example, during a presentation where a presenter uses the acronym "PCB", server 60 may recognize the session as a presentation and that a definition for "PCB" may be useful to conferees, may obtain the definition and may present the definition in a secondary background location as shown at 186 in FIG. 12 in a manner consistent with the action rule set of FIG. 6). As another instance, server 60 may automatically provide additional content sharing tools to personal computing devices (e.g., laptops 200, 202 in FIG. 1) if content sharing is encouraged when a specific paradigm (e.g., generation) is sensed. At block 114, the server facilitates the actions identified at block 112.

Referring again to block 112 in FIG. 7, where server 60 performs some automated search for content as a function of an instantaneous conferencing paradigm, the content selected to form a search query may include different subsets of the content obtained at step 106. For instance, the content used to form a query may include all of the content obtained (e.g., content on surfaces 16, 18 and 20 as well as content gleaned from verbal communication in the space 10). As another instance, the content used to form a query may only include spatially proximate content on the surfaces 16, 18 and 20. As another instance, content to formulate a query may only include content generated by one conferee in a space within a temporal window. For example, where a first conferee generates content for 10 minutes, generated no content for the next 30 minutes and then again generates content for 10 minutes, a query may be based on only the first conferee's content over the most recent 10 minute generation period. As still one other instance, data used to generate a search query may include archived content for one or a sub-set of conferees (e.g., a presenter's archived content on a topic, archives for three collaborators, etc.). Another instance includes content queued but either previously presented or not yet presented via the common emissive surfaces. Other instances of content for generating queries are contemplated.

In at least some embodiments it is contemplated that the system server 60 may take into account additional information when identifying actions to be performed when specific paradigms occur. For example, in at least some embodiments it is contemplated that server 60 will have access to a participant database (see 72 in FIG. 3) in which information about conferees is stored which can be used to identify a sophistication level of conferees in a conference related to content being presented within the conference session. Here, where the sophistication level of conferees is relatively high or sophisticated, more complex supplemental content may be identified and presented. Where conferee sophistication is relatively low, less complex supplemental content maybe identified and presented. Where conferee sophistication is within some intermediate range, intermediate level of complexity supplemental content may be identified and presented. To this end, referring to FIG. 8, an exemplary participant database 72 is shown that includes a participant column 120 and a participant characteristics column 122. The participant column 120 lists each possible participant in a conference. For example, if a company has 500 employee, the participant column may list each one of the 500 employees. The participant characteristics column 122 lists characteristics for each one of the participants in column 120. For instance, the participant characteristics 122 may indicate how many years a participant in column 120 has been employed by a particular company, the job title of the employee, the education level of the employee and the type or types of degree or degrees received, memberships in company teams such as development teams, manufacturing teams, specific product teams, etc. Other participant characteristics may be provided in column 122 for each of the participants in column 120 where the other characteristics are useable to establish a sophistication level of the associated participant in any of various topics or areas of content that may occur during a conferencing session.

Referring now to FIG. 9, a second conference paradigm rule set 68*a* is shown that includes a paradigm column 130 and an action column 134 akin to the paradigm and action columns 90 and 92, respectively, described above with respect to FIG. 6. In addition, a paradigm sophistication column 132 is provided that includes different levels of sophistication for each one of the paradigms in column 130. For example, for the presentation paradigm in column 130, three entries, "sophisticated", "intermediate" and "unsophisticated" appear in column 132 indicating levels of sophistication of conferees with respect to content being presented, collaborated on, generated, etc.

Referring still to FIG. 9, for each one of the participant sophistication entries in column 132, a separate set of actions is presented in column 134. To this end, each of the action sub-sets in column 134 for the three entries in column 134 corresponding to the presentation paradigm in column 130 includes five separate actions where first through third actions and the last action are identical but the fourth action is different for each sophistication level. In column 134, the fourth action corresponding to the sophisticated entry in column 132 requires a server to "select detailed supplemental content" (see 140) while the fourth steps corresponding to the intermediate and unsophisticated entries at 142 and 144 require selection of an intermediate level of supplemental content and selection of a low level supplemental content, respectively. Thus, based on the level of sophistication reflected in column 132, different sets of supplemental content are selected at actions 140, 142 and 144, respectively.

Figure 8:
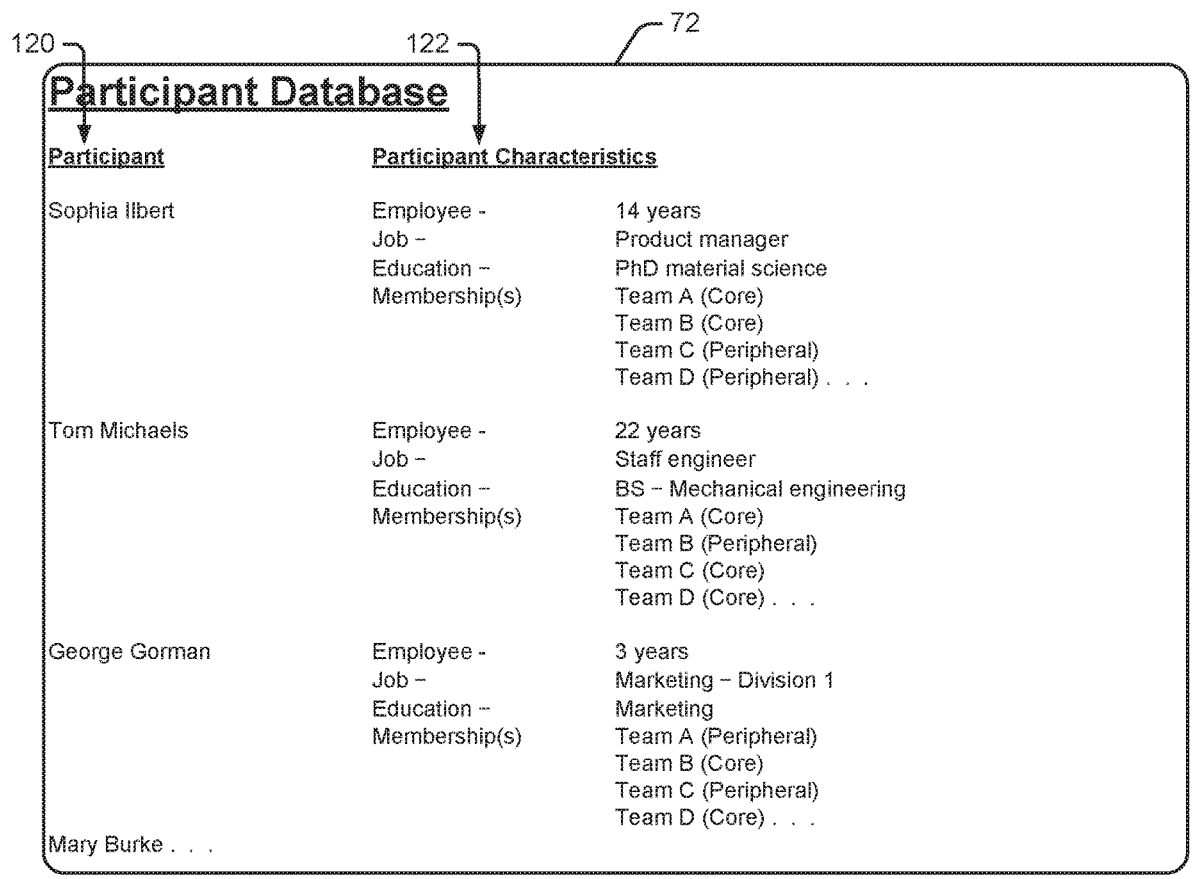
FIG. 8 is a schematic diagram illustrating an exemplary participant database that may be used in some of the methods described in the present disclosure.
Figure 10:
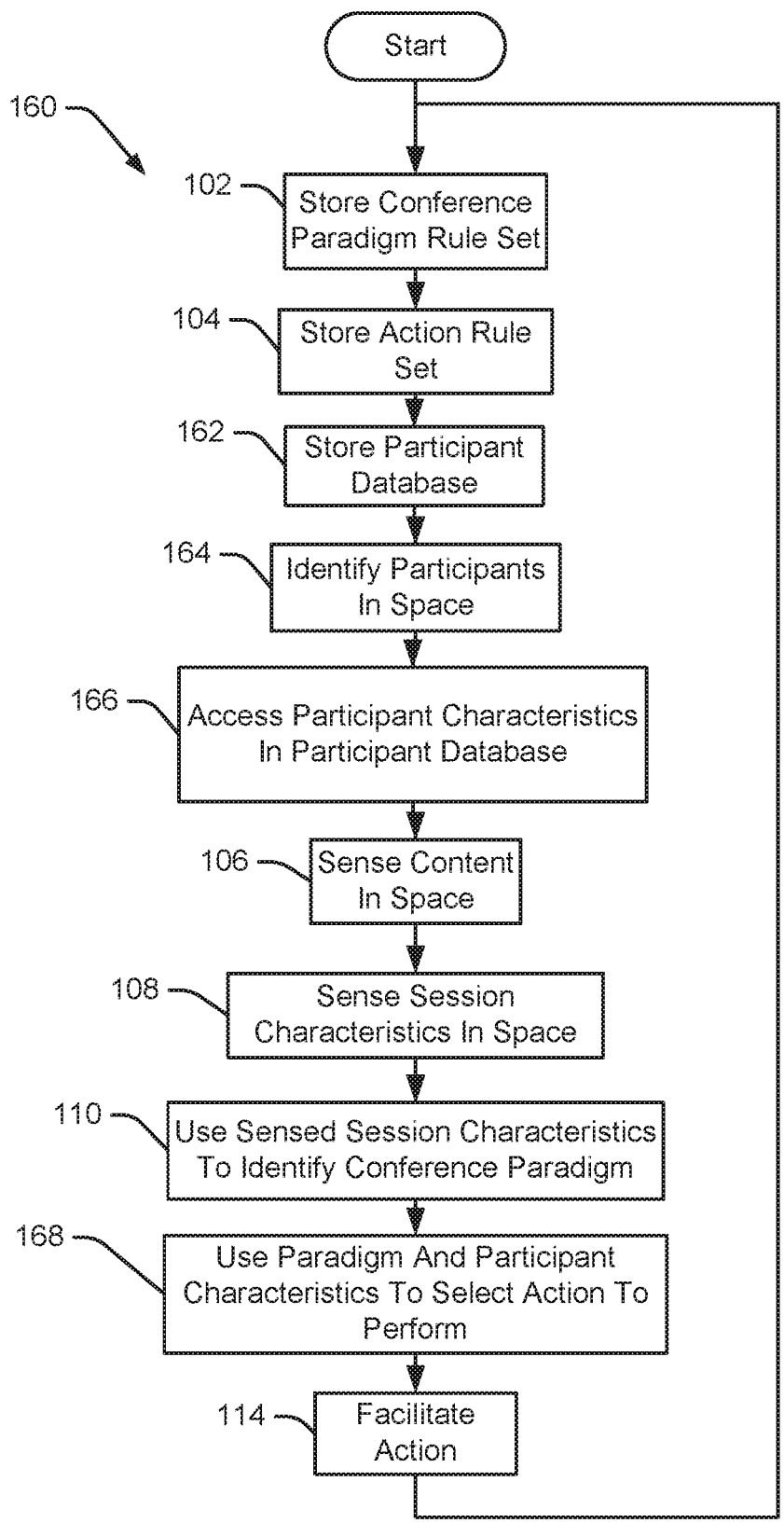
FIG. 10 is a flow chart illustrating another exemplary method that is consistent with some aspects of the present disclosure.

Referring now to FIG. 10, another process 160 that is similar to process 100 described above with respect to FIG. 7 is illustrated, albeit where conferee sophistication is taken into account when selecting server actions to be performed. In FIG. 10, process blocks that are similar to the process blocks described above with respect to FIG. 7 are labeled with the same numeral. At the first block, a conference paradigm rule set akin to the rule set shown in FIG. 5 is stored. At block 104, an action rule set like the rule set shown in FIG. 9 is stored. At block 162 a participant database like the one shown in FIG. 8 is stored. At block 164, while a session is in process, server 60 determines the identity of participants within conference space 10. At block 166, server 60 accesses a participant database and identifies participant characteristics in the database. At block 106, server 60 senses content in the conference space 10. At block 108 server 60 senses session characteristics in space 10. At block 110, server 60 uses the session characteristics to identify an instantaneous conference paradigm. At block 168, serve 60 uses a conference paradigm and the participant characteristics to select an action from the action rule set shown in FIG. 9. At block 114, server 60 facilitates the identified action or actions.

Figure 13:
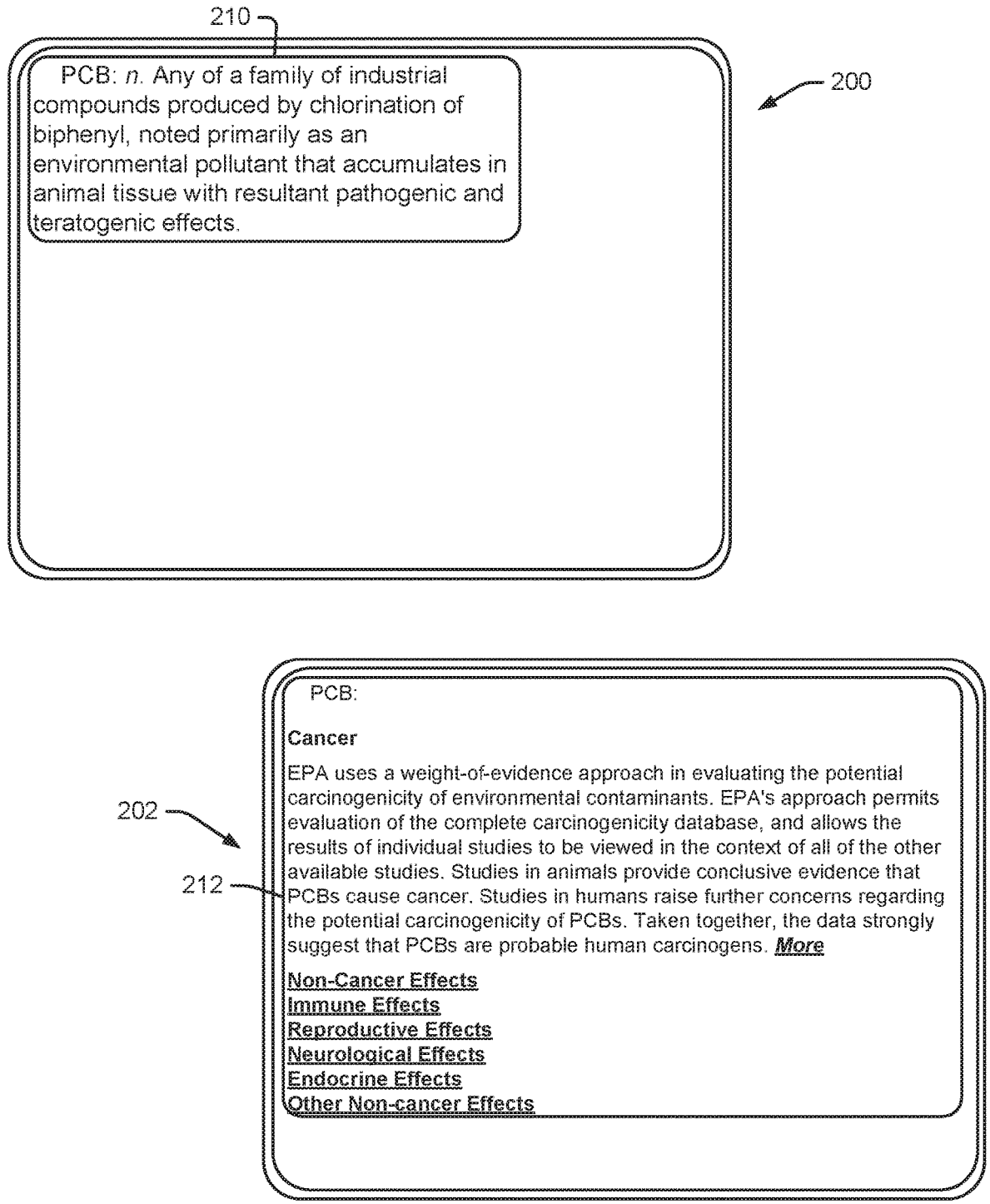
FIG. 13 shows a screen shot that may be presented on different personal portable devices shown in FIG. 1.

Referring again to FIGS. 1 and 3, in at least some embodiments it is contemplated that server 60 may be able to communicate with personal computing devices 200, 202, 204, etc., in space 10 via access points 17 or even directly where the personal devices include built in access point or transceiver capability. Here, actions may include some type of automated activity to customize content delivery to conferees. For instance, where a first conferee has a much stronger background than a second conferee in presented content, the system may automatically perform different searches to generate different results or may select different results from a single search to be presented to the first and second conferees. In this regard, see for instance FIG. 13 where exemplary screen shots are shown for displays on devices 200 and 202, respectively. The screen shot on device 200 includes a window 210 that presents a simple definition of "PCB" while the screen shot on device 202 includes much more detail about PCBs including a brief discussion about how they relate to cancer and links to other information that may be of interest to a sophisticated conferee.

The systems described above include a server that facilitates different processes or methods based on instantaneous communication paradigms that occur within a conference space. In at least some cases it is contemplated that paradigms may shift regularly during a session. Where a paradigm changes, server 60 will recognize the change and will automatically select and facilitate an action set or sequence that is consistent with the new paradigm. In at least some cases a hysteresis may be built into the system so that the system does not flip between different paradigms to often which could be distracting. For instance, where a presentation has been occurring for 25 minutes, if sensed characteristics are consistent with a co-evaluation paradigm for less than 5 minutes, the server may be programmed to continue to process the action sequence associated with a presentation. Once the co-evaluation paradigm has persisted for at least five minutes, server 60 may switch to a co-evaluation sequence of actions.

In at least some embodiments it is contemplated that sensed session characteristics may be used to, in effect, recognize that two or more sessions are occurring in a single conference room and to then control or supplement the separate sessions independently of each other. For instance, half way through a presentation by a first conferee a group of eight conferees in a space 10 may divide up into two groups of four arranged around the left and right common emissive surfaces 18 and 20 (see again FIG. 1) to facilitate breakout smaller group sessions. In this case the system may be programmed to automatically recognize that there are two sub-sessions occurring and to simply treat all content for the sub sessions separate from each other while still informing the sub session activities using content from the prior large presentation session. Here, one of the sub sessions may proceed in a manner consistent with a first paradigm (e.g., a presentation) while the other sub session proceeds in a manner consistent with a second paradigm (e.g., generation). Here, server 60 would support each sub session independently as described above. Supplemental content would be presented proximate the space used by a sub-group of conferees. In other cases where sub sessions both relate to a similar topic, supplemental content for one sub session may also be presented to the second sub session conferees in at least some embodiments.

While automated content searching based on paradigm is particularly interesting, in some cases paradigm based actions will not include automated searching. For instance, in at least some cases during a single conferee presentation, server 60 may not allow conferees to share additional content located by those conferees (e.g., located via conferee initiated internet queries) via the common displays while the server 60 may enable and even encourage sharing of any content by any conferee during content collaboration by providing interface tools right on conferee's personal portable devices (e.g. laptops) or by providing tools for conferees to share directly on the common emissive surfaces when present. In this regard, see U.S. patent application Ser. No. 14/053,213 titled "Egalitarian Control Apparatus And Method For Sharing Information In A Collaborative Workspace" which describes a virtual interface overlay that can be presented over a desktop image on a laptop or other portable device for sharing the desktop by replication on a common display. An interface akin to the overlay may be presented in some systems according to the present disclosure when sharing is encouraged. The '213 application is incorporated herein by reference in its entirety.

While the system is describe above as one for enhancing conferencing among conferees within a conference space 10, some embodiments will support similar concepts and processes where one or more conferees is remotely located or where two conference spaces akin to the space 10 shown in FIG. 1 are remotely linked together so two sets of conferees participate in the same conference. For instance, where one conferee patches into a conference in space 10 using a remoter personal laptop or other device, sensed characteristics may include the location of the remote conferee and content generation/sharing by the remote conferee (both verbal and on emissive surfaces).

In many applications Kinect or other similar devices will be particularly useful for generating session characteristics as a Kinect device has many extremely useful features and can perform various applications to generate useful information. By combining Kinect features and data with data output from other sensor devices the power of the system grows exponentially. For instance, as described above, once conferee identity is determined at any time in a space 10 at a specific location, the Kinect device or several devices that cover the conference space 10 can be used to track conferee locations and associate a conferee at any time with a specific conferee. Then, content generated, gestures, verbal communications, etc., by the conferee at any location in space 10 can be associated with a specific conferee in any extremely cost effective manner.

In some embodiments more than one action sequence may be performed when a specific conferencing paradigm is identified. For instance, one action sequence may result if a first set of supplemental content based on all content previously shared during a session while another action sequence may result in a second set of supplemental content based on a search query formulated using only content from a presenter. In this case the second supplemental content set may be presented via a main or central emissive surface while the first supplemental content may be presented via one of the side emissive surfaces 18 or 20.

While the system is described above in the context of a conference space, it should be appreciated that the system may be implemented in the context of a single person workspace. For instance, a Kinect device or other sensor devices may be used to determine when a single person at a work station is generating new content (e.g., via a word processor), when the person is evaluating existing content and when the conversing on a telephone and may be able to change various system actions based thereon. For example, while a person may want a system to automatically generate supplemental content all the time, the person may want the content delivered differently based on whether or not the person is using a work station to generate content or to evaluate previously existing content.

Thus, the above system uses sensor devices to generate sensed session characteristics that can be used to discern collaboration paradigms which are in turn used to automatically drive system action sequences designed to optimally aid conferees in achieving conference goals. Sensed session characteristics may include but should not be limited to conferee presence, conferee location, conferee orientation, conferee posture, relative juxtapositions between conferees, content locations, artifact locations, relative juxtapositions of content to content, relative juxtapositions of conferees to content, relative juxtapositions to furniture artifacts, which conferee or conferees are verbally communicating, which conferee or conferees are performing gestures, the temporal relationships between verbal content, the temporal relationships between gestures, the temporal relationships between when content is generated or presented, the temporal relationships between when content is presented via emissive surfaces and verbally generated content, relative amounts of content generated by conferees and types of generated content, volumes of verbal annunciations by conferees, amount and type of content generated, and various combinations of the above. Conference paradigms include presentation, collaboration, content generation, evaluation and co-evaluation as well as combinations of the above and other paradigms that may be identified. Action sequences may include automatically formulating search queries based on any subset of group or conferee specific content, controlling how content is presented within a conference space, controlling the sequence of content presented in a space, implementing conferencing interfaces on common emissive surfaces and/or on personal portable computing devices, restricting or enabling various search or other application capabilities on conferee devices or on common emissive surfaces, etc. Any action may also at least in part be based on content itself or on other characteristics such as conferee specific characteristics, archived or queued content, etc. Any action resulting in providing supplemental content or other actions that cause information to be presented via a display screen or emissive surface may be presented via a common display screen or via one or more personal computing devices and different actions may result in different content or tools being provided to different subsets of conferees based on conferee identity, instantaneous or historical paradigms, etc.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

Thus, the invention is to cover all modifications, equivalents, and alternatives falling within the spirit and scope of the invention as defined by the following appended claims.

What is claimed is:

1. A system for optimizing conference session activities within a conference space, the system comprising:
    at least a first emissive surface located within the conference space for viewing by a plurality of conferees that are located within the conference space;
    at least a first sensor within the conference space for sensing session characteristics of a communication session occurring between the plurality of conferees within the conference space; and
    a processor receiving the sensed session characteristics, identifying at least one of a plurality of different action sequences to perform as a function of the sensed session characteristics, and performing the at least one identified action sequence;
    wherein the at least one of a plurality of action sequences includes identifying first and second different subsets of supplemental information and presenting the first and second subsets at different locations on the at least a first emissive surface.

2. The system of claim 1 wherein the system identifies the first subset as a function of at least a first subset of content shared within the conference space to form a first search query and performs the first search query on a first dataset and identifies the second subset as a function of at least a second subset of content shared within the conference space to form a second search query and performs the second search query on a second dataset.

3. The system of claim 2 wherein the first and second datasets are identical.

4. The system of claim 3 wherein the first and second search queries are different.

5. The system of claim 2 wherein the first and second datasets are different while the first and second search queries are identical.

6. The system of claim 1 wherein N conferees participate in the communication session and wherein the system identifies the at least a first subset of content shared by identifying content shared by a first subset of the N conferees during the communication session.

7. The system of claim 6 where the first subset of conferees includes a single conferee.

8. The system of claim 6 wherein the first subset of conferees includes at least first and second of the N conferees wherein N is great than 2.

9. The system of claim 6 wherein the system identifies the at least a second subset of content shared by identifying content shared by a second subset of the N conferees.

10. The system of claim 9 wherein the first subset of conferees includes a single conferee and wherein the second subset of conferees includes all N conferees.

11. The system of claim 9 wherein the at least a first emissive surface includes a first common emissive surface viewable generally within the conference space and at least a first private emissive surface arranged for viewing by only a first conferee and wherein the first and second information subsets are presented on the common emissive surface and the private emissive surface, respectively.

12. The system of claim 1 wherein the processor is further programmed to determine identity of at least a first conferee within the conference space, the step of identifying at least one action sequence including identifying the action sequence as a function of the identity of the at least a first conferee and the first subset of information.

13. The system of claim 1 wherein the sensed session characteristics include at least locations of conferees within the conference space.

14. The system of claim 13 wherein the locations include relative locations of conferees within the conference space.

15. The system of claim 14 wherein the locations include relative locations of conferees with respect to at least one of each other, the at least a first emissive surface, and content presented within the conference space.

16. The system of claim 1 wherein the sensed session characteristics include at least an identity of at least one of the conferees.

17. The system of claim 1 wherein the at least a first emissive surface includes a first common emissive surface and a first private emissive surface used by a first conferee, the second subset of supplemental information being presented on the first private emissive surface for viewing by the first conferee.

18. The system of claim 1 wherein the first subset of information includes information from a first conferee's private dataset and the second subset of information includes at least some information that is not included in the first conferee's private dataset.

19. A system for optimizing conference session activities within a conference space, the system comprising:
at least a first sensor for sensing audio data within the conference space; and
a processor receiving the audio data and identifying audio data generated by a first conferee within the conference space and audio data generated by a second conferee within the conference space, performing a first action sequence based at least in part on the audio data generated by the first conferee and performing a second action sequence based at least in part on the audio data generated by the second conferee.

20. The system of claim 19 wherein the first action sequence includes generating a database query based at least in part on the audio data generated by the first conferee, performing the query to generate a first response dataset and presenting the first response data set to the first conferee.

21. The system of claim 20 further including at least a first emissive surface located within the conference space and wherein the step of presenting the first response data set includes presenting the first response data set via the first emissive surface.

22. The system of claim 20 wherein the second action sequence includes generating a database query based at least in part on the audio data generated by the second conferee, performing the query to generate a second response dataset and presenting the second response data set to the second conferee.

23. The system of claim 22 further including at least first and second emissive surfaces located within the conference space, the step of presenting the first response data set includes presenting the first response data set via the first emissive surface and the step of presenting the second response data set includes presenting the second response data set via the second emissive surface.

24. The system of claim 19 wherein the processor is programmed to further identify audio data generated by a third conferee within the conference space and, wherein, the first action sequence is based at least in part on the audio data generated by the first and third conferees.

25. The system of claim 19 further including at least a first emissive surface located within the conference space, wherein the step of performing a first action sequence includes manipulating content presented on the at least a first emissive surface.

26. The system of claim 25 wherein the step of performing a second action sequence includes manipulating content presented on the at least a first emissive surface.

27. The system of claim 25 wherein at least a subset of content is presented on the at least a first emissive surface prior to the first conferee generating the audio data and wherein the step of manipulating content includes moving the subset of content from an initial location to a different location on the at least a first emissive surface.

28. The system of claim 19 wherein the second action sequence is different than the first action sequence.

29. The system of claim 19 further including at least a first emissive surface located within the conference space for presenting visual content to conferees within the conference space, the processor performing the first action sequence based at least in part on visual content presented on the at least a first emissive surface by the first conferee.

30. The system of claim 29 wherein the processor performs the second action sequence based at least in part of visual content presented on the at least a first emissive surface by the second conferee.

31. The system of claim 29 wherein the second conferee uses a personal computing device including a private emissive surface for presenting visual content to the second conferee within the conference space, the second action sequence including identifying visual content based at least in part on the audio data generated by the second conferee and presenting the identified content on the private emissive surface.

32. The system of claim 19 further including at least a first camera for sensing conferee locations within the conference space, the processor identifying audio data generated by the first conferee using the sensed audio data and the conferee locations within the conference space and identifying audio data generated by the second conferee using the sensed audio data and the conferee locations within the conference space.

33. The system of claim 32 wherein the at least a first sensor for sensing audio data includes a plurality of audio sensors at different locations within the conference space and wherein the processor uses volume levels of audio signals generated by the plurality of audio sensors to identify locations within the conference space from which audio data emanates.

34. The system of claim 19 wherein the first actions sequence includes identifying a first subset of supplemental information and presenting the first subset to at least the first conferee.

35. The system of claim 34 wherein the step of identifying a first subset of supplemental information includes forming a first search query based at least in part on the audio data generated by the first conferee and performing the first search query on a first dataset.

36. The system of claim 35 wherein the first dataset includes information from a first conferee's private dataset.

37. The system of claim 36 wherein the first dataset also includes at least some information that is not included in the first conferee's dataset.

38. The system of claim 36 wherein the first conferee uses a personal computing device including an emissive surface and wherein the first action sequence includes presenting the first subset of supplemental information to the first conferee via the emissive surface.

39. The system of claim 19 further including a common emissive surface within the conference space, the first action sequence including modifying content on the common emissive surface.

40. The system of claim 39 wherein the first conferee uses a personal computing device that includes a second emissive surface, the first action sequence including modifying the content on the second emissive surface.

41. The system of claim 40 wherein the content on the common emissive surface is modified differently than the content on the second emissive surface.

42. The system of claim 19 wherein the processor uses the sensed audio data to detect first and second voices corresponding to the first and second conferees, respectively, and uses the voices to determine identities of the first and second conferees.

43. The system of claim 42 wherein the first action sequence is based at least in part on each of the audio data generated by the first conferee and the identity of the first conferee.

44. The system of claim 19 further including a second sensor for sensing conferee locations within the conference space, the first action sequence based at least in part on each of the audio data generated by the first conferee and the location of the first conferee within the conference space.

45. The system of claim 19 further including a second sensor for sensing conferee locations within the conference space, the first action sequence based at least in part on each of the audio data generated by the first conferee and the location of the first conferee relative to at least one other conferee within the conference space.

46. The system of claim 19 further including at least a first common emissive surface within the conference space, the first action sequence including modifying content on the at least a first common emissive surface in a first way and the second action sequence including modifying content on the at least a first common emissive surface in a second way.

47. The system of claim 19 wherein the first action sequence is selected at least in part based on a comparison of a percent of audio data generated by the first conferee relative to all audio data generated within the conference space.

48. A system for optimizing conference session activities within a conference space, the system comprising:
at least a first sensor for sensing audio data within the conference space; and
a processor receiving the audio data and distinguishing audio data generated by a first conferee within the conference space and audio data generated by a second conferee within the conference space from at least a subset of audio data generated by at least one other conferee within the conference space and performing an action sequence based at least in part on the audio data generated by the first and second conferees.

49. The system of claim 48 further including at least a first emissive surface located within the conference space, wherein the step of performing an action sequence includes manipulating content presented on the at least a first emissive surface.

50. The system of claim 49 wherein at least a subset of content is presented on the at least a first emissive surface prior to the first conferee generating the audio data and wherein the step of manipulating content includes moving the subset of content from an initial location to a different location on the at least a first emissive surface.

51. The system of claim 48 further including at least a first camera for sensing conferee locations within the conference space, the processor identifying audio data generated by the first conferee using the sensed audio data and the conferee locations within the conference space and identifying audio data generated by the second conferee using the sensed audio data and the conferee locations within the conference space.

52. The system of claim 48 wherein the actions sequence includes identifying a first subset of supplemental information and presenting the first subset to at least the first conferee.

53. The system of claim 48 further including a common emissive surface within the conference space, the action sequence including modifying content on the common emissive surface.

54. The system of claim 53 wherein the first conferee uses a personal computing device that includes a second emissive surface, the action sequence including modifying the content on the second emissive surface.

55. The system of claim 48 wherein the processor uses the sensed audio data to detect first and second voices corresponding to the first and second conferees, respectively, and uses the voices to determine identities of the first and second conferees.

56. The system of claim 55 wherein the action sequence is based at least in part on each of the audio data generated by the first conferee and the identity of the first conferee.

* * * * *